United States Patent
Cheong et al.

(10) Patent No.: US 11,330,651 B2
(45) Date of Patent: May 10, 2022

(54) ELECTRONIC DEVICE USING BLUETOOTH COMMUNICATION AND OPERATING METHOD THEREOF

(71) Applicant: Samsung Electronics Co., Ltd., Suwon-si (KR)

(72) Inventors: Gupil Cheong, Suwon-si (KR); Sungjun Choi, Suwon-si (KR); Gibeom Kim, Suwon-si (KR); Doosu Na, Suwon-si (KR); Hyunah Oh, Suwon-si (KR); Hyungseoung Yoo, Suwon-si (KR); Doosuk Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 56 days.

(21) Appl. No.: 16/969,749

(22) PCT Filed: Feb. 12, 2019

(86) PCT No.: PCT/KR2019/001699
§ 371 (c)(1),
(2) Date: Aug. 13, 2020

(87) PCT Pub. No.: WO2019/164168
PCT Pub. Date: Aug. 29, 2019

(65) Prior Publication Data
US 2020/0413462 A1 Dec. 31, 2020

(30) Foreign Application Priority Data
Feb. 23, 2018 (KR) .................. KR10-2018-0022228

(51) Int. Cl.
*H04W 4/00* (2018.01)
*H04W 76/14* (2018.01)
(Continued)

(52) U.S. Cl.
CPC .......... *H04W 76/14* (2018.02); *H04B 17/318* (2015.01); *H04W 4/80* (2018.02); *H04W 52/245* (2013.01)

(58) Field of Classification Search
CPC ..... H04W 76/14; H04W 4/80; H04W 52/245; H04W 52/24; H04B 17/318
(Continued)

(56) References Cited

U.S. PATENT DOCUMENTS 7,389,088 B2 * 6/2008 Kim .................... H04B 17/318
455/41.1
7,756,477 B2 * 7/2010 Lee ....................... H04W 52/48
455/41.2
(Continued)

FOREIGN PATENT DOCUMENTS

GB 2542267 A 3/2017
JP 2015-076737 A 4/2015
(Continued)

OTHER PUBLICATIONS

Extended European Search Report dated Feb. 26, 2021, issued in European Application No. 19757502.0.
(Continued)

*Primary Examiner* — Marceau Milord
(74) *Attorney, Agent, or Firm* — Jefferson IP Law, LLP

(57) ABSTRACT

An electronic device according to various embodiments may comprise a communication module and a processor, wherein: the communication module is configured to transmit a data packet, received from the processor, to an external electronic device connected to the electronic device, receive, from the external electronic device, a response packet corresponding to the data packet, acquire a received signal strength indication (RSSI) of the response packet, and transmit, to the processor, a first packet including informa-
(Continued)

tion on the RSSI when the response packet is received; and the processor is configured to identify the RSSI of the response packet by using the first packet received from the communication module.

15 Claims, 22 Drawing Sheets

(51) Int. Cl.
  *H04B 17/318* (2015.01)
  *H04W 4/80* (2018.01)
  *H04W 52/24* (2009.01)

(58) Field of Classification Search
  USPC .......................................................... 370/329
  See application file for complete search history.

(56) References Cited

U.S. PATENT DOCUMENTS

| | | | | |
|---|---|---|---|---|
| 8,477,731 | B2* | 7/2013 | Nanda ................... | H04W 88/06 |
| | | | | 370/332 |
| 8,483,704 | B2* | 7/2013 | Nanda ................... | H04W 48/16 |
| | | | | 455/456.1 |
| 9,264,123 | B2* | 2/2016 | Das ....................... | H04B 17/318 |
| 9,736,639 | B2* | 8/2017 | Saari ..................... | H04W 4/029 |
| 9,787,103 | B1* | 10/2017 | Leabman .............. | H04W 12/06 |
| 9,877,353 | B2* | 1/2018 | Lee ....................... | H04W 76/34 |
| 10,141,768 | B2 | 11/2018 | Leabman .............. | H02J 50/80 |
| 10,490,043 | B2* | 11/2019 | Emmanuel ........... | H04W 72/082 |
| 11,026,283 | B2* | 6/2021 | Singh .................... | H04W 4/027 |
| 11,166,141 | B2* | 11/2021 | Cheong ................ | H04W 8/005 |
| 11,202,199 | B2* | 12/2021 | Han ........................ | H04W 8/28 |
| 2004/0242258 | A1 | 12/2004 | Kim | |
| 2005/0073522 | A1* | 4/2005 | Aholainen .............. | H04L 41/22 |
| | | | | 345/440 |
| 2007/0213008 | A1* | 9/2007 | Lee ............................ | H04B 7/02 |
| | | | | 455/41.2 |
| 2011/0187931 | A1 | 8/2011 | Kim | |
| 2012/0014275 | A1 | 1/2012 | Koo et al. | |
| 2015/0050880 | A1 | 2/2015 | Choi et al. | |
| 2015/0098348 | A1 | 4/2015 | Ogura et al. | |
| 2015/0373749 | A1* | 12/2015 | Palin ........................ | H04W 4/80 |
| | | | | 455/41.2 |
| 2016/0128117 | A1 | 5/2016 | Engelien-Lopes et al. | |
| 2016/0150357 | A1* | 5/2016 | Jung ................. | H04W 52/0206 |
| | | | | 455/41.1 |
| 2016/0337985 | A1 | 11/2016 | Amizur et al. | |
| 2016/0374028 | A1 | 12/2016 | Narang et al. | |
| 2017/0059687 | A1 | 3/2017 | Dinesh et al. | |

FOREIGN PATENT DOCUMENTS

| | | |
|---|---|---|
| KR | 10-2004-0108676 A | 12/2004 |
| KR | 10-0542101 B1 | 1/2006 |
| KR | 10-0744297 B1 | 7/2007 |
| KR | 10-20100025691 A | 3/2010 |
| KR | 10-2010-0082703 A | 7/2010 |
| KR | 10-1182153 B1 | 9/2012 |
| KR | 10-2015-0019892 A | 2/2015 |
| KR | 10-2016-0017029 A | 2/2016 |

OTHER PUBLICATIONS

Korean Office Action dated Apr. 1, 2022, issued in Korean Patent Application No. 10-2018-0022228.

* cited by examiner

Connection_Handle [i]                                410

| Value  | Parameter Description |
|--------|----------------------|
| 0xXXXX | Connection_Handle.<br>Range: 0x0000-0x0EFF (all other values reserved for future use) |

HC_Num_OF_Completed_Packets [i]                      460

| Value      | Parameter Description |
|------------|----------------------|
| N = 0xXXXX | The number of HCI Data Packets that have been completed (Transmitted or flushed) for the associated Connection_Handle since the previous time the event was returned.<br>Range for N: 0x0000-0xFFFF |

|  | 510 |
|---|---|
| BIT VALUE | RSSI (dBm) |
| 0x0 (0000) | ~ -48 |
| 0x1 (0001) | -49 ~ -51 |
| 0x2 (0010) | -52 ~ -54 |
| 0x3 (0011) | -55 ~ -57 |
| 0x4 (0100) | -58 ~ -60 |
| 0x5 (0101) | -61 ~ -63 |
| 0x6 (0110) | -64 ~ -66 |
| 0x7 (0111) | -67 ~ -69 |
| 0x8 (1000) | -70 ~ -72 |
| 0x9 (1001) | -73 ~ -75 |
| 0xA (1010) | -76 ~ -78 |
| 0xB (1011) | -79 ~ -81 |
| 0xC (1100) | -82 ~ -84 |
| 0xD (1101) | -85 ~ -87 |
| 0xE (1110) | -88 ~ -90 |
| 0xF (1111) | -91 ~ |

GOOD: 520 (0x0–0x6)
NORMAL: 530 (0x7–0xC)
BAD: 540 (0xD–0xF)

FIG.5

ELECTRONIC DEVICE USING BLUETOOTH COMMUNICATION AND OPERATING METHOD THEREOF

CROSS-REFERENCE TO RELATED APPLICATION(S)

This application is a National Phase Entry of PCT International Application No. PCT/KR2019/001699, which was filed on Feb. 12, 2019, and claims priority under 35 U.S.C. § 119 of Korean Patent Application No. 10-2018-0022228, filed on Feb. 23, 2018 in the Korean Intellectual Property Office the disclosure of which is incorporated herein by reference in its entirety.

TECHNICAL FIELD

Various embodiments relate to an electronic device using Bluetooth communication and an operating method thereof.

BACKGROUND ART

According to the development of communication technology, an electronic device may communicate with another electronic device through various communication technologies. For example, an electronic device may transmit or receive data to or from another electronic device by using Bluetooth communication.

Bluetooth technology means a short-range wireless communication technology by which electronic devices are connected to each other to exchange data or information. Electronic devices may share data with each other at low power by using Bluetooth communication technology.

An electronic device using Bluetooth communication may include a processor (e.g., host) and a communication module (e.g., controller). The communication module of the electronic device may transmit a data packet to another electronic device connected to the electronic device, and may receive a response packet corresponding to the data packet from the another electronic device. The communication module of the electronic device may calculate and obtain the received signal strength indication (RSSI) of the response packet.

The processor of the electronic device may transmit a separate command for identifying the RSSI to the communication module to identify the RSSI obtained by the communication module.

DETAILED DESCRIPTION OF THE INVENTION

Technical Problem

A processor (e.g., host) of an electronic device is required to transmit a designated command (e.g., a command requesting identification of RSSI) to a communication module (e.g., controller) in order to identify the RSSI of a response packet. For example, if the processor transmits a separate command to the communication module, the communication module may transmit the RSSI of a response packet to the processor. A processor of a conventional electronic device can identify the RSSI of a packet received from another electronic device only if the processor transfers a designated command to a communication module (e.g., host controller).

However, in order to identify the RSSI of a packet received from another electronic device during a desired period, the processor of the electronic device is required to continuously transmit a designated command to the communication module. In addition, the processor cannot precisely determine the connection state of Bluetooth communication in real time without transmission of a designated command.

Various embodiments may provide a method in which, even though a processor of an electronic device does not transmit a separate command to a communication module of the electronic device, the communication module can transmit a packet including information relating to the RSSI of a response packet received from another electronic device, to the processor (e.g., host).

Technical Solution

An electronic device according to various embodiments may include a communication module and a processor, wherein the communication module is configured to: transmit a data packet received from the processor to an external electronic device connected to the electronic device; receive a response packet corresponding to the data packet from the external electronic device; acquire a received signal strength indication (RSSI) of the response packet; and if the response packet is received, transmit a first packet including information on the RSSI to the processor, and the processor is configured to identify the RSSI of the response packet by using the first packet received from the communication module.

An operating method of an electronic device including a communication module and a processor according to various embodiments of the disclosure may include: transmitting, by the communication module, a data packet to an external electronic device connected to the electronic device; receiving a response packet corresponding to the data packet from the external electronic device by the communication module; acquiring a received signal strength indication (RSSI) of the response packet by the communication module; if the response packet is received, transmitting a first packet including information on the RSSI to the processor by the communication module; and identifying the RSSI of the response packet by the processor by using the first packet.

A non-transitory computer-readable recording medium according to various embodiments may store a program for executing operations of: transmitting, by a communication module of an electronic device, a data packet to an external electronic device connected to the electronic device; receiving a response packet corresponding to the data packet from the external electronic device by the communication module; acquiring a received signal strength indication (RSSI) of the response packet by the communication module; if the response packet is received, transmitting a first packet including information on the RSSI to a processor of the electronic device by the communication module; and identifying the RSSI of the response packet by the processor of the electronic device by using the first packet.

Advantageous Effects

According to various embodiments, even though a processor of an electronic device using Bluetooth communication does not transmit a separate command to a communication module of the electronic device, the electronic device can identify information of RSSI relating to an external electronic device, whereby the electronic device can identify a connection state with the external electronic device in real time.

BRIEF DESCRIPTION OF DRAWINGS

FIGS. 4A and 4B are tables illustrating a method for processing a first packet by a first communication module, according to various embodiments;

FIG. 5 is a table illustrating a method for processing a first packet by a first communication module, according to various embodiments;

MODE FOR CARRYING OUT THE INVENTION

Figure 1:
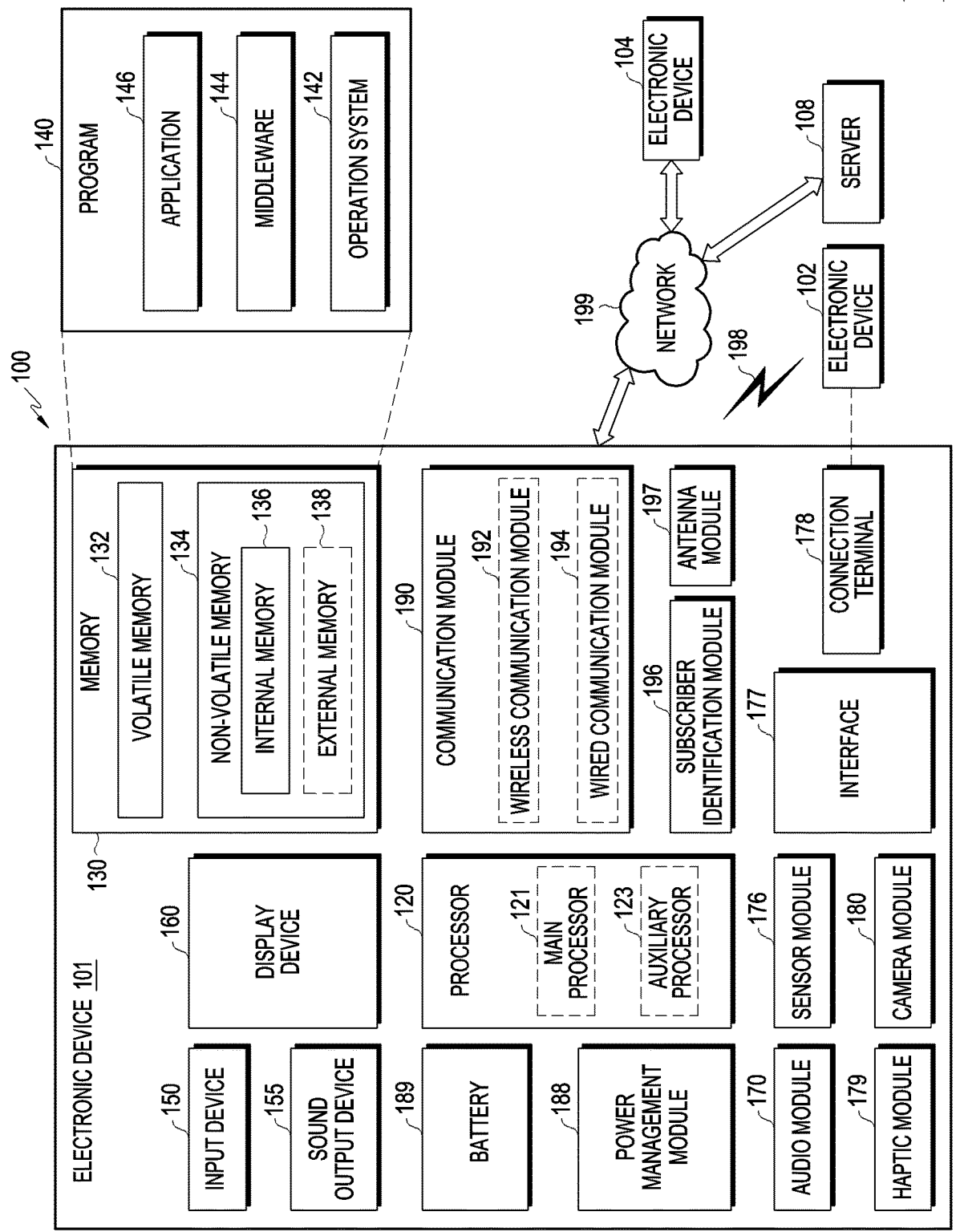
FIG. 1 is a block diagram of an electronic device in a network environment, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
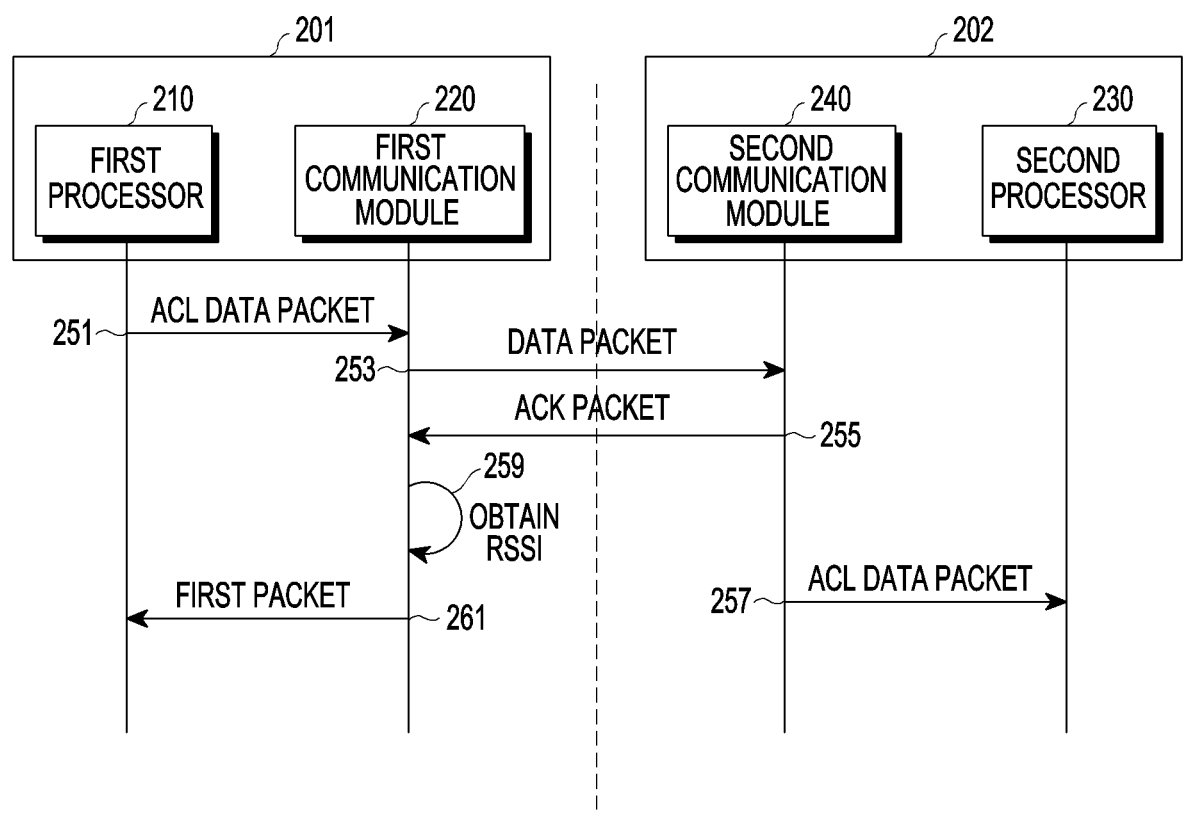
FIG. 2 is a data flow by which an electronic device according to various embodiments communicates with an external electronic device.

FIG. 2 is a data flow by which an electronic device according to various embodiments of the disclosure communicates with an external electronic device.

Referring to FIG. 2, an electronic device 201 may include a first processor 210 and a first communication module 220. An external electronic device 202 may include a second processor 230 and a second communication module 240. The electronic device 201 may be implemented to be substantially identical or similar to the electronic device 101 illustrated in FIG. 1. The external electronic device 202 may be implemented to be substantially identical or similar to the electronic device 102 illustrated in FIG. 1.

Hereinafter, each of the first processor 210 and the second processor 230 may be implemented as a host proposed in a Bluetooth standard. In addition, each of the first communication module 220 and the second communication module 240 may be implemented as a controller proposed in a Bluetooth standard.

According to an embodiment, the electronic device 201 may transmit or receive data to or from the external electronic device 202 by using a wireless communication technology. For example, the wireless communication technology may include Bluetooth communication, WiFi communication, ZigBee communication, and/or NFC communication.

Hereinafter, the wireless communication technology is assumed to be Bluetooth communication. In addition, the terms described in the specification of the disclosure may have the same meanings as those of the terms proposed in a Bluetooth standard. However, the technical concept of the disclosure is not limited thereto.

The electronic device 201 may be connected to the external electronic device 202. For example, the electronic device 201 may be connected to the external electronic device 202 through Bluetooth communication. The electronic device 201 may configure a connection (or pairing) with the external electronic device 202.

Hereinafter, an operation in which the electronic device 201 is connected to the external electronic device 202 may imply a connection (or pairing) operation proposed in a Bluetooth standard.

The first processor 210 (e.g., the processor 120 in FIG. 1) may control overall operations of the electronic device 201. The first processor 210 may be implemented as a host proposed in a Bluetooth standard. The first processor 210 may transmit at least one command proposed in a Bluetooth standard to the first communication module 220 (e.g., the communication module 190 in FIG. 1).

The first communication module 220 (e.g., the communication module 190 in FIG. 1) may be implemented as a controller proposed in a Bluetooth standard. In addition, the first communication module 220 may be implemented as a link manager proposed in a Bluetooth standard. The first communication module 220 may be connected to the first processor 210 through a host-controller interface (HCI). For example, the first communication module 220 may include a Bluetooth communication module.

The second processor 230 (e.g., the processor 120 in FIG. 1) may control overall operations of the external electronic device 202. The second processor 230 may be implemented as a host proposed in a Bluetooth standard.

The second communication module 240 (e.g., the communication module 190 in FIG. 1) may be implemented as a controller proposed in a Bluetooth standard. In addition, the second communication module 240 may be implemented as a link manager proposed in a Bluetooth standard. The second communication module 240 may be connected to the second processor 230 through a host-controller interface (HCI). For example, the second communication module 240 may include a Bluetooth communication module.

In operation 251, the first processor 210 may transmit a data packet (ACL DATA PACKET) of an asynchronous connectionless link (ACL) to the first communication module 220. For example, the first processor 210 may transmit a data packet (ACL DATA PACKET) of an asynchronous connectionless link to the first communication module 220 in order to transmit a data packet (DATA PACKET) to the external electronic device 202.

In operation 251, the first communication module 220 may receive the data packet (ACL DATA PACKET) of the asynchronous connectionless link from the first processor 210.

In operation 253, the first communication module 220 may transmit a data packet (DATA PACKET) corresponding to the data packet (ACL DATA PACKET) of the asynchronous connectionless link to the second communication module 240 of the external electronic device 202 connected to the electronic device 201. For example, the first communication module 220 may transmit the data packet (DATA PACKET) to the second communication module 240 by using Bluetooth communication. The second communication module 240 may receive the data packet (DATA PACKET) from the first communication module 220.

In operation 255, if the second communication module 240 receives the data packet (DATA PACKET), the second communication module may transmit a response packet (ACK PACKET) corresponding to the data packet (DATA PACKET) to the first communication module 220. The first communication module 220 may receive the response packet (ACK PACKET) from the second communication module 240. For example, the response packet (ACK PACKET) may be an "acknowledgment response packet" proposed in a Bluetooth standard.

In operation 257, the second communication module 240 may transmit a data packet (ACL DATA PACKET) of an asynchronous connectionless link, corresponding to the data packet (DATA PACKET) to the second processor 230.

In operation 259, the first communication module 220 may autonomously calculate a received signal strength indication (RSSI) of the response packet (ACK PACKET) and obtain the RSSI of the response packet (ACK PACKET).

In operation 261, if the first communication module 220 receives the response packet (ACK PACKET), the first communication module may obtain the RSSI of the response packet (ACK PACKET) and transmit a first packet including information of the obtained RSSI to the first processor 210. For example, the first communication module 220 may transmit the first packet to the first processor 210 after adding information of the RSSI of the response packet (ACK PACKET) to the first packet.

The first communication module 220 may obtain pieces of information through which an antenna state and/or a communication connection state between the electronic device 201 and the external electronic device 202 can be determined, the obtaining performed based on the response packet (ACK PACKET). In addition, the first communication module 220 may transmit the first packet to the first processor 210 after adding, to the first packet, pieces of information (e.g., pieces of information relating to bit error rate (BER), packet error rate (PER), used channel map, and/or NACK count) through which the antenna state and/or the communication connection state can be determined.

According to an embodiment, the first packet may be a packet (e.g., "Number of Completed Packets" proposed in a Bluetooth standard) indicating the number of data packets completed to be transmitted from the electronic device 201 to the external electronic device 202. According to an embodiment, the first packet may be a separate packet different from a packet indicating the number of data packets completed to be transmitted from the electronic device 201 to the external electronic device 202. For example, the first packet may be a packet having a format obtained by adding a new byte including the information relating to the RSSI of the response packet (ACK PACKET) to the format of the packet indicating the number of data packets completed to be transmitted from the electronic device 201 to the external electronic device 202.

The first packet is a packet (e.g., "Number of Completed Packets"), which is proposed in a Bluetooth standard, indicating the number of packets completed to be transmitted from the electronic device 201 to the external electronic device. In this case, while the first communication module 220 stores data packets to be transmitted to the external electronic device 202 in a corresponding buffer, the first communication module may periodically transmit the first packet indicating the number of packets completed to be transmitted (flushed) to the first processor 210 (or host) until the first communication module finally reports that all of pended ACL data packets have been transmitted (or flushed).

In various embodiments, the first communication module 220 may transmit the first packet to the first processor 210 in response to reception of all response packets (ACK PACKETs). Alternatively, the first communication module 220 may transmit the first packet if the number of times of reception of a response packet (ACK PACKET) reaches a preconfigured number of times. For example, if a response packet (ACK PACKET) is received three times, the first communication module 220 may transmit the first packet to the first processor 210. The first communication module 220 may reset the number of times of reception of a response packet (ACK PACKET). That is, every time when the first communication module 220 receives a response packet (ACK PACKET) by a preconfigured reception number of times, the first communication module may transmit one number of the first packet to the first processor 210.

According to various embodiments, the first processor 210 may identify the RSSI of the response packet (ACK PACKET) by using the first packet. The processor 210 may determine a connection state between the electronic device 201 and the external electronic device 202, based on the identified RSSI. For example, the first processor 210 may determine a connection state relating to wireless communication (e.g., Bluetooth communication) between the electronic device 201 and the external electronic device 202. The first processor 210 may provide information relating to the connection state to a user through a visual, tactual, and/or auditory effect.

According to various embodiments, the first processor 210 may identify the RSSI of the response packet (ACK PACKET) in real time by using the first packet, without transmitting a separate designated command. In addition, the first processor 210 may determine a connection state relating to Bluetooth communication between the electronic device 201 and the external electronic device 202 without transmitting a separate designated command to the first communication module 220.

According to various embodiments, the first processor 210 may determine a connection state relating to Bluetooth communication between the electronic device 201 and the external electronic device 202 through the RSSI of a signal received by the first communication module 220. For example, the first processor 210 may determine whether a connection state relating to Bluetooth communication belongs inside, above, or below a golden receive power range.

An electronic device 201 according to various embodiments may include a communication module 220 and a processor 210, wherein the communication module 220 is configured to: transmit a data packet received from the processor 210 to an external electronic device 202 connected to the electronic device 201; receive a response packet corresponding to the data packet from the external electronic device 202; acquire a received signal strength indication (RSSI) of the response packet; and if the response packet is received, transmit a first packet including information on the RSSI to the processor 210, and the processor 210 is configured to identify the RSSI of the response packet by using the first packet received from the communication module 220.

The first packet may be a packet indicating the number of data packets completed to be transmitted from the electronic device 201 to the external electronic device 202.

The communication module 220 may add the information relating to the RSSI to at least a part of bits in a parameter relating to a connection handle included in the first packet.

The at least a part of bits may include a bit reserved in a field of the parameter relating to the connection handle, which is proposed in a Bluetooth standard.

The communication module 220 may add the information relating to the RSSI to at least a part of bits in a parameter which is included in the first packet and relates to the number of data packets completed to be transmitted from the electronic device 201 to the external electronic device 202.

The at least a part of bits may include a bit that is not reserved in a field of the parameter relating to the number of the data packets completed to be transmitted, which is proposed in the Bluetooth standard.

The first packet may be a packet obtained by adding the information relating to the RSSI to the packet indicating the number of the data packets completed to be transmitted from the electronic device 201 to the external electronic device 202.

The processor 210 may be configured to provide information relating to a connection state between the electronic device 201 and the external electronic device 202, based on the RSSI.

The processor 210 may be configured to adjust transfer power of the data packet transmitted through the communication module 220 to the external electronic device 202, based on the RSSI.

The processor 210 may be configured to change a transfer speed of a data packet transmitted through the communication module 220 to the external electronic device, based on the RSSI.

The processor 210 may be configured to select a codec using a bandwidth corresponding to the RSSI, based on the RSSI.

If the electronic device 101 is connected to a plurality of external electronic devices 102 and 104, the processor 120 or 210 may be configured to identify RSSIs relating to the plurality of external electronic devices 102 and 104, and determine a processing order of signals received from the plurality of external electronic devices 102 and 104, based on the RSSIs.

Figure 3:
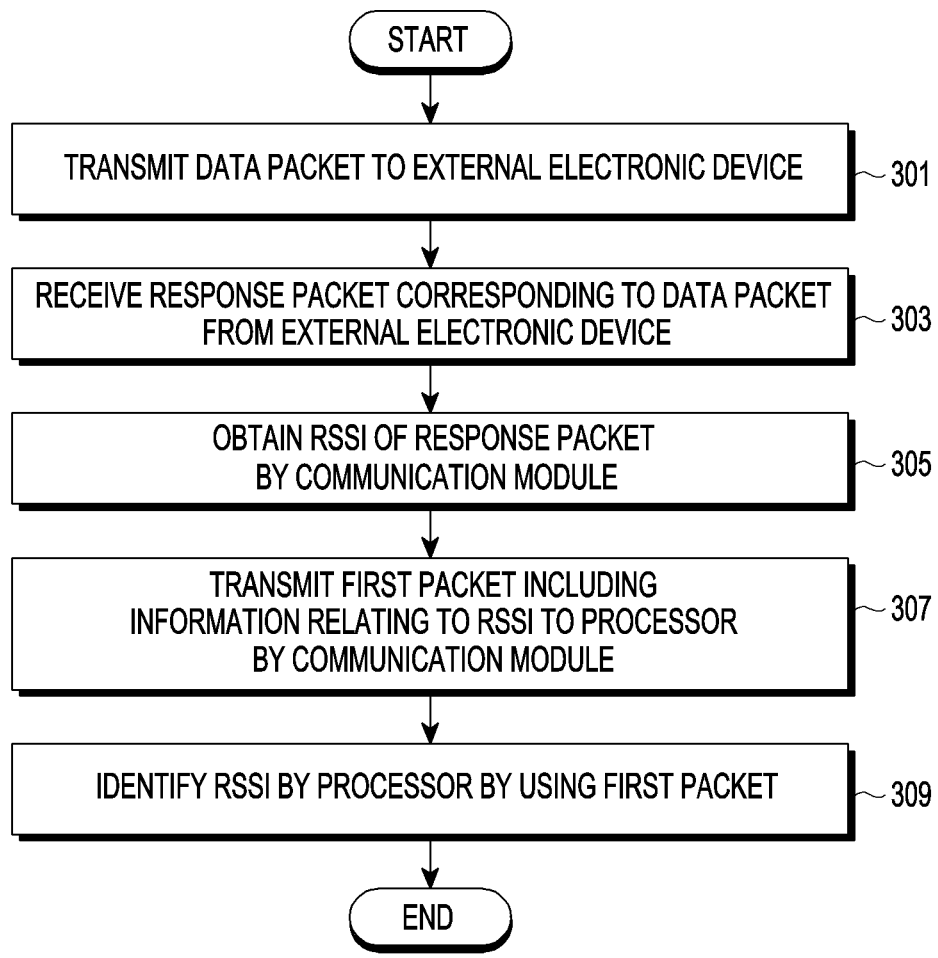
FIG. 3 is a flowchart illustrating an operation of electronic device according to various embodiments.

FIG. 3 is a flowchart illustrating an operation of electronic device according to various embodiments.

Referring to FIG. 3, in operation 301, an electronic device (the electronic device 201 in FIG. 2) may transmit a data packet to an external electronic device (e.g., external electronic device 220 in FIG. 2) through a communication module (the first communication module 220 in FIG. 2).

In operation 303, the electronic device 201 may receive a response packet corresponding to the data packet from the external electronic device 202 through the communication module 220. For example, if a communication module (e.g., the second communication module 240 in FIG. 2) of the external electronic device 201 receives a data packet from the communication module 220 of the electronic device 201, the communication module may transmit a response packet to the communication module 220 of the electronic device 201.

In operation 305, the communication module 220 of the electronic device 201 may obtain an RSSI of the response packet. For example, the communication module 220 may calculate the strength of a signal corresponding to the response packet and obtain the RSSI of the response packet according to a result of the calculation. The communication module 220 of the electronic device 201 may include information relating to the RSSI of the response packet in a first packet.

In operation 307, the communication module 220 of the electronic device 201 may transmit the first packet including the information relating to the RSSI to a processor (the first processor 210 in FIG. 2) of the electronic device 201. For example, the first packet may be a packet (e.g., "number of completed packets") that is proposed in a Bluetooth standard and indicates the number of packets completed to be transmitted from the electronic device 201 to the external electronic device. According to another embodiment, the first packet may be a packet different from a packet indicating the number of packets completed to be transmitted from the electronic device 201 to the external electronic device 202. For example, the first packet may be a packet having a format obtained by adding a new byte including the information relating to the RSSI of the response packet to the format of the packet indicating the number of data packets completed to be transmitted from the electronic device 201 to the external electronic device 202.

In operation 309, the processor 210 of the electronic device 201 may identify the RSSI by using the first packet. For example, the processor 210 may determine a connection state relating to Bluetooth communication between the electronic device 201 and the external electronic device 202, based on the identified RSSI. According to an embodiment, the processor 210 may provide information relating to the determined connection state through an output device (e.g., the output device 155 in FIG. 1) and/or a display device (e.g., the display device 160 in FIG. 1).

FIGS. 4A and 4B are tables illustrating a method for processing a first packet by a first communication module, according to various embodiments.

Referring to FIGS. 4A and 4B, a first communication module (e.g., the first communication module 220 in FIG. 2) may include an RSSI of a response packet (ACK PACKET) in a first packet.

According to various embodiments, the first packet may be a packet (e.g., "number of completed packets" proposed in a Bluetooth standard) that is proposed in a Bluetooth standard and indicates the number of packets completed to be transmitted by an electronic device (e.g., the electronic device 201 in FIG. 2) with respect to each connection handle. The packet (or event) indicating the number of packets completed to be transmitted may be used to notify a first processor (or host) (e.g., the first processor 210 in FIG. 2) of the number of data packets (or HCI data packets) completed to be transmitted (or flushed) with respect to a corresponding connection handle after a packet indicating the number of packets previously completed is transmitted to the first processor (or host) 210. If a first packet is transmitted to the processor, a corresponding buffer space designated to transmit a data packet may be freed by the first communication module (or controller) 220.

A first packet may include a parameter relating to a connection handle and a parameter relating to the number of packets completed to be transmitted with respect to the connection handle.

FIG. 4A shows a table 410 relating to a parameter relating to a connection handle of the disclosure.

The first communication module 220 may add information relating to an RSSI of a response packet to at least a part of bits in a parameter relating to a connection handle included in a first packet. For example, a parameter relating to a connection handle proposed in a Bluetooth standard is implemented by 2 bytes. Among the two bytes, only the lower 12 bits are used for the connection handle, and the upper four bits are reserved. The first communication module 220 may add information relating to an RSSI of a response packet to the upper four bits 420, which are reserved, in a field of a parameter relating to a connection handle.

FIG. 4B shows a table 460 relating to a parameter relating to the number of packets completed to be transmitted with respect to a connection handle of the disclosure.

The first communication module 220 may add information relating to an RSSI of a response packet to at least a part of bits in a parameter relating to the number of packets completed to be transmitted with respect to a connection handle included in a first packet. For example, a parameter relating to the number of packets completed to be transmitted with respect to a connection handle, which is proposed in a Bluetooth standard, is implemented by two bytes. A credit value allowing communication between the first processor (or host) 210 and the first communication module (or controller) 220 is limited, and use of both the two bytes is thus impossible. The first communication module 220 may add information relating to an RSSI of a response packet to an upper one byte 470, which is not reserved, in a field of a parameter relating to the number of packets completed to be transmitted with respect to a connection handle, which is proposed in a Bluetooth standard.

FIG. 5 is a table 510 illustrating a method for processing a first packet by a first communication module, according to various embodiments.

Referring to FIG. 5, a first communication module (e.g., the first communication module 220 in FIG. 2) may include an RSSI of a response packet in a first packet.

According to various embodiments, the first communication module 220 may add a bit value corresponding to the RSSI to the first packet, based on the table 510 stored in a memory (e.g., the memory 130 in FIG. 1). According to various embodiments, the first communication module 220 may add a bit value corresponding to the RSSI to the first packet, based on the table 510 stored in a memory included in the first communication module 220.

The first communication module 220 may configure a bit value corresponding to a reception signal of the response packet. The first communication module 220 may include the configured bit value in the first packet. For example, if the RSSI of the response packet is larger than −48 dBm, the first communication module 220 may configure the bit value to 0x0(0000). For example, if the RSSI of the response packet is smaller than −91 dBm, the first communication module 220 may configure the bit value to 0xF(1111). The first communication module 220 may configure the bit value to be different by 3 dBm for each stage in addition to the stages described above. For example, if the RSSI of the response packet is −70 dBm, the first communication module 220 may configure the bit value to 0x8(1000).

According to various embodiments, the first processor 210 may identify an RSSI, based on the table 510 stored in the memory 130. For example, the first processor 210 may identify a bit value indicating an RSSI, which is included in the first packet, and determine an RSSI corresponding to the bit value, which is identified in the table 510, as the RSSI of the response packet. In addition, the first processor 210 may determine a connection state relating to wireless communication (e.g., Bluetooth communication) between the electronic device 201 and the external electronic device 202, based on the RSSI. For example, if the RSSI belongs to a range 520 higher than −67 dBm, the first processor 210 may determine a connection state between the electronic device 201 and the external electronic device 202 to be "good". If the RSSI belongs to a range 540 lower than −84 dBm, the first processor 210 may determine a connection state between the electronic device 201 and the external electronic device 202 to be "bad". If the RSSI belongs to a range 530 from −84 dBm to −67 dBm, the first processor 210 may determine a connection state between the electronic device 201 and the external electronic device 202 to be "normal".

FIG. 5 illustrates the table 510 relating to an RSSI for convenience of explanation, but the bit values or the values relating to RSSI included in the table 510 correspond to examples, and the technical concept of the disclosure is not limited thereto.

Figure 6:
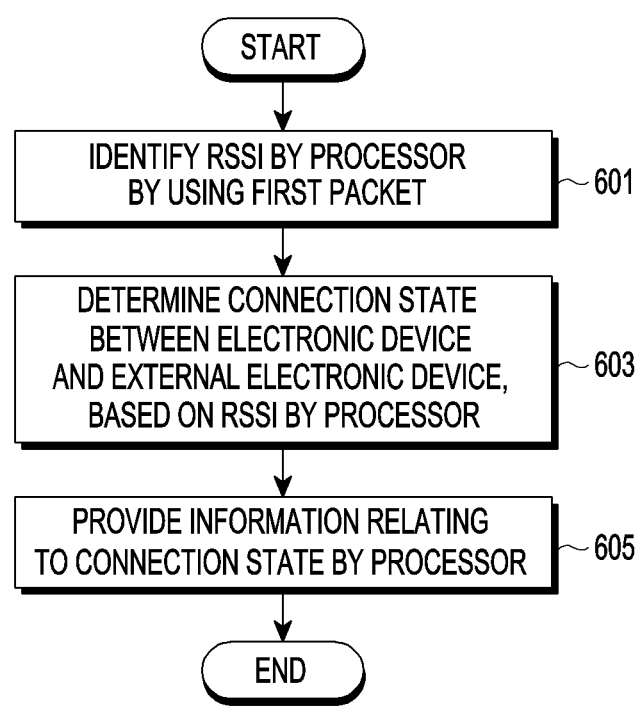
FIG. 6 is a flowchart illustrating an operation of electronic device according to various embodiments.

FIG. 6 is a flowchart illustrating an operation of electronic device according to various embodiments.

Referring to FIG. 6, in operation 601, a processor (e.g., the first processor 210 in FIG. 2) of an electronic device (e.g., the electronic device 201 in FIG. 2) may identify an RSSI of a response packet by using a first packet received from a communication module (e.g., the first communication module 220 in FIG. 2).

In operation 603, the processor 210 may determine a connection state relating to wireless communication (e.g., Bluetooth communication) between the electronic device 201 and an external electronic device (e.g., the external electronic device 202 in FIG. 2), based on the identified RSSI.

In operation 605, the processor 210 may perform control such that information relating to the connection state between the electronic device 201 and the external electronic device 202 is provided to a user through an output device (e.g., the output device 155 in FIG. 1) and/or a display device (e.g., the display device 160 in FIG. 1). For example, the processor 210 may perform control such that the information relating to the connection state is displayed through a display (e.g., the display device 160). In addition, the processor 210 may also perform control such that the information relating to the connection state is output through light, vibration, and/or sound. For example, the processor 210 may display a graph, a status bar, and/or a status window indicating the connection state between the electronic device 201 and the external electronic device 202 through a display device (e.g., the display device 160 in FIG. 1). In addition, if the connection state between the electronic device 201 and the external electronic device 202 is bad, the processor 210 may output vibration or sound, and/or light through the output device 155.

Figure 7:
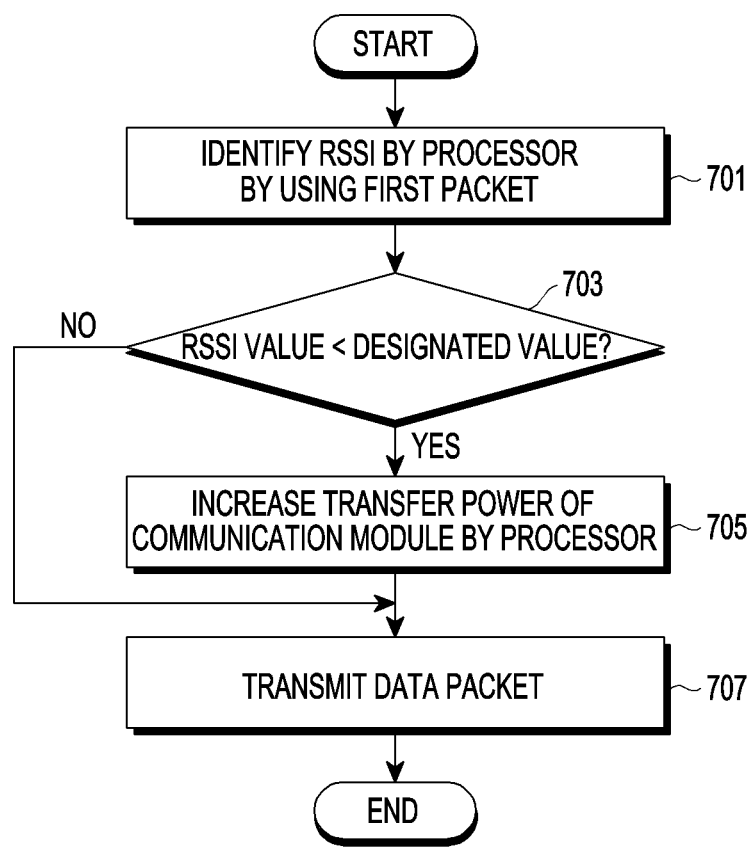
FIG. 7 is a flowchart illustrating an operation of electronic device according to various embodiments.

FIG. 7 is a flowchart illustrating an operation of electronic device according to various embodiments.

Referring to FIG. 7, in operation 701, a processor (e.g., the first processor 210 in FIG. 2) of an electronic device (e.g., the electronic device 201 in FIG. 2) may identify an RSSI of a response packet received from an external electronic device (e.g., the external electronic device 202 in FIG. 2) by using a first packet received from a communication module (e.g., the first communication module 220 in FIG. 2).

According to various embodiments, the processor 210 may adjust transfer power of the communication module 220, based on the RSSI of the response packet.

According to various embodiments, in operation 703, the processor 210 may compare an RSSI value of the response packet and a designated value. For example, the designated value may be a value through which a connection state between an electronic device (e.g., the electronic device 201 in FIG. 2) and an external electronic device (e.g., the external electronic device 202 in FIG. 2) may be determined to be not good.

If the RSSI value is smaller than the designated value (Yes in operation 703), the processor 210 may increase the transfer power of the communication module 220 in operation 705. For example, the processor 210 may transmit a designated command to the communication module 220 in order to increase the transfer power of the communication module 220. Accordingly, the processor 210 may increase the strength of a transfer power of a data packet (or a signal corresponding to the data packet) transmitted to the external electronic device 202.

If the RSSI value is not smaller than the designated value (No in operation 703), the processor 210 may not increase the transfer power of the communication module 220.

In operation 707, the processor 210 may transmit a data packet with the transfer power having been adjusted according to the RSSI. For example, if the RSSI value is smaller than the designated value, the processor 210 may transmit a signal corresponding to a data packet, the transfer strength of which has been increased, to the external electronic device 202. Through the operations, the electronic device 201 may maintain a stable connection state with the external electronic device 202 without receiving a feedback for a connection state (or RSSI) from the external electronic device 202.

Figure 8:
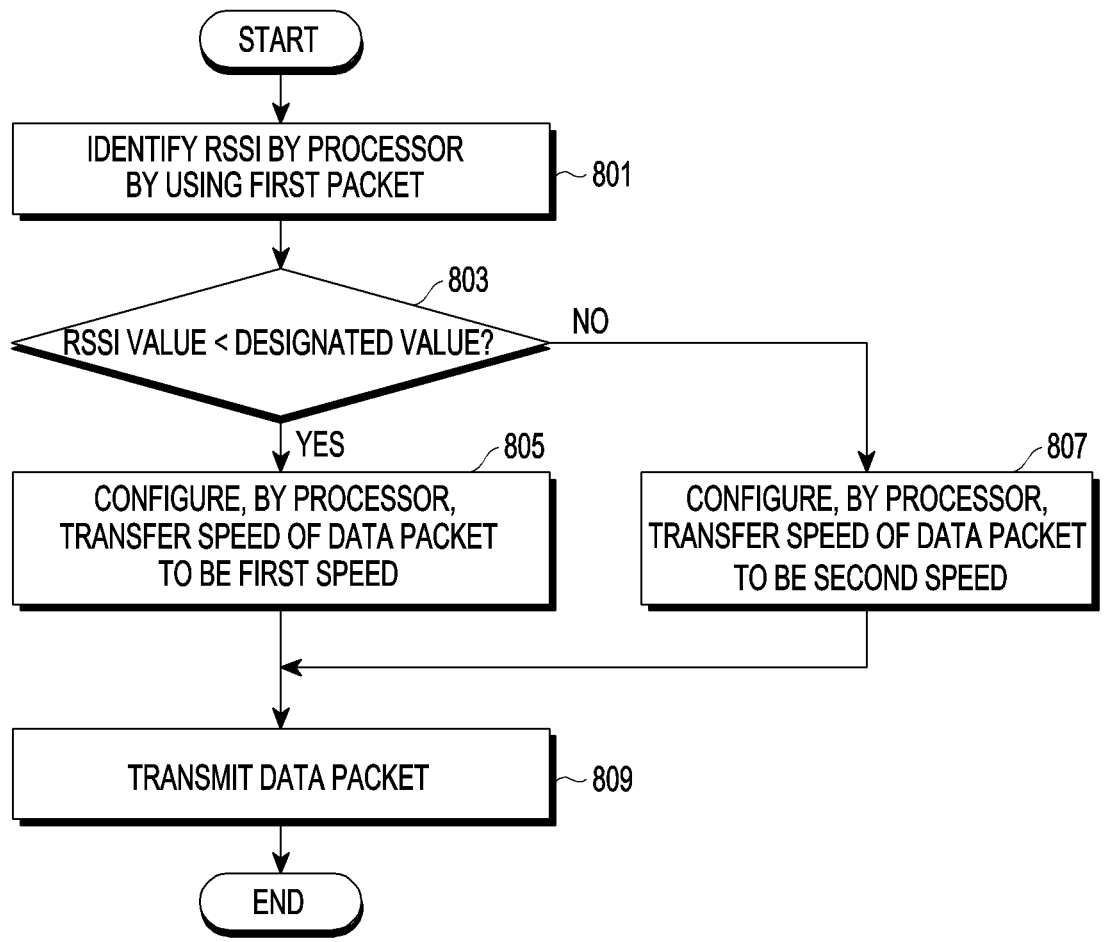
FIG. 8 is a flowchart illustrating an operation of electronic device according to various embodiments.

FIG. 8 is a flowchart illustrating an operation of electronic device according to various embodiments.

Referring to FIG. 8, in operation 801, a processor (e.g., the first processor 210 in FIG. 2) of an electronic device (e.g., the electronic device 201 in FIG. 2) may identify an RSSI of a response packet received from an external electronic device (e.g., the external electronic device 202 in FIG. 2) by using a first packet received from a communication module (e.g., the first communication module 220 in FIG. 2).

According to various embodiments, the processor 210 may change a transfer speed of a data packet transmitted to an external electronic device (e.g., the external electronic device 202 in FIG. 2), based on the RSSI of the response packet.

According to various embodiments, in operation 803, the processor 210 may compare an RSSI value of the response packet and a designated value. For example, the designated value may be a value through which a connection state between an electronic device (e.g., the electronic device 201 in FIG. 2) and the external electronic device 202 may be determined to be good.

If the RSSI value is smaller than the designated value (Yes in operation 803), the processor 210 may determine the connection state between the electronic device 201 and the external electronic device 202 to be not good, and configure the transfer speed of a data packet to be a first speed, in operation 805. For example, the processor 210 may configure the transfer speed of a data packet to be the first speed corresponding to low energy 1 Mbps proposed in a Bluetooth standard (Bluetooth 5.0). In addition, the processor 210 may change a physical layer of a communication module (e.g., the first communication module 220 in FIG. 2) to a layer corresponding to 1M PHY.

If the RSSI value is not smaller than the designated value (No in operation 803), the processor 210 may determine the connection state between the electronic device 201 and the external electronic device 202 to be good, and configure the transfer speed of a data packet to be a second speed, in operation 807. For example, the processor 210 may configure the transfer speed of a data packet to be the second speed corresponding to low energy 2 Mbps proposed in a Bluetooth standard. In addition, the processor 210 may change a physical layer of the communication module 220 to a layer corresponding to 2M PHY.

In operation 809, the processor 210 may perform control such that a data packet is transmitted through the communication module 220 with the transfer speed having been adjusted according to the RSSI.

Figure 9:
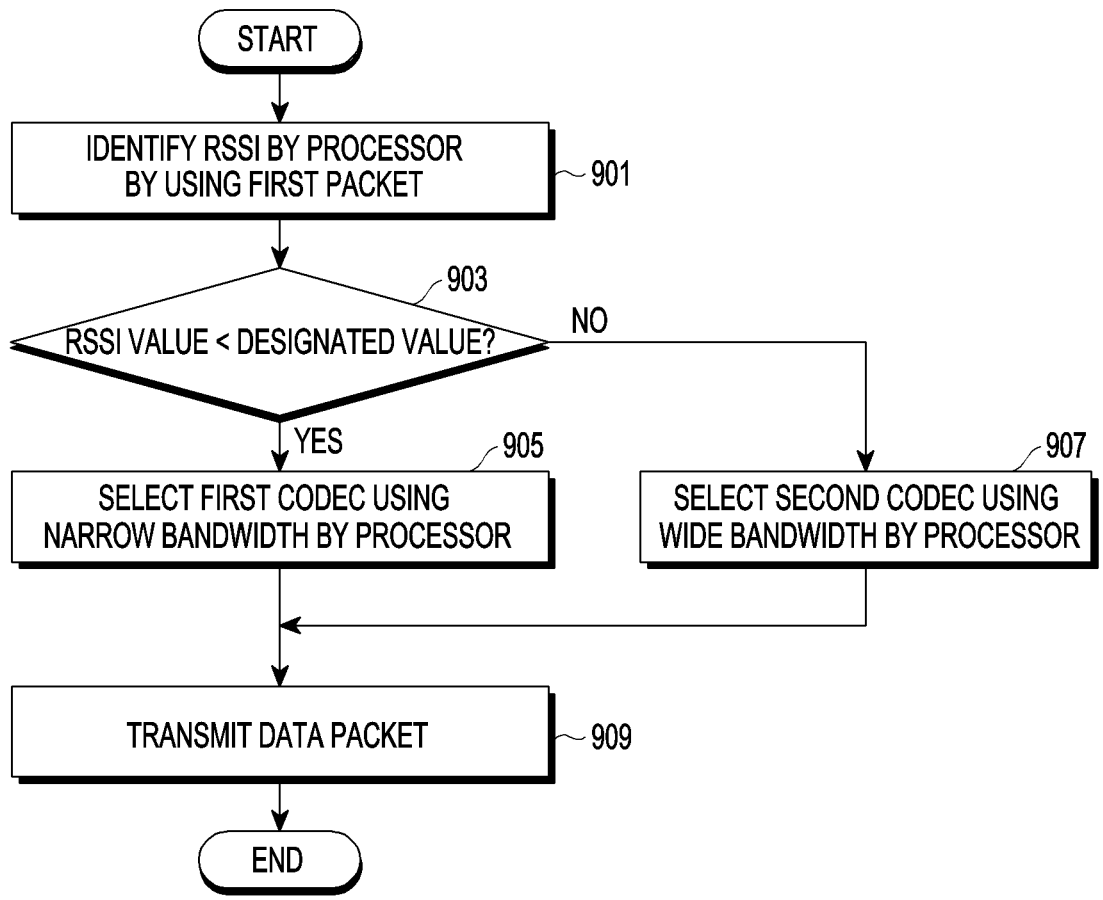
FIG. 9 is a flowchart illustrating an operation of electronic device according to various embodiments.

FIG. 9 is a flowchart illustrating an operation of electronic device according to various embodiments.

Referring to FIG. 9, in operation 901, a processor (e.g., the first processor 210 in FIG. 2) of an electronic device (e.g., the electronic device 201 in FIG. 2) 201 may identify an RSSI of a response packet received from an external electronic device (e.g., the external electronic device 202 in FIG. 2) by using a first packet received from a communication module (e.g., the first communication module 220 in FIG. 2).

According to various embodiments, the processor 210 may select a codec, based on the RSSI of the response packet. For example, if a data packet corresponds to a packet relating to audio data (or video data), the processor 210 may select a codec (e.g., audio codec or video codec) using a bandwidth (or frequency bandwidth) corresponding to the RSSI.

According to various embodiments, in operation 903, the processor 210 may compare an RSSI value of the response packet and a designated value. For example, the designated value may be a value through which a connection state between an electronic device (e.g., the electronic device 201 in FIG. 2) and an external electronic device (e.g., the external electronic device 202 in FIG. 2) may be determined to be good.

If the RSSI value is smaller than the designated value (Yes in operation 903), the processor 210 may determine the connection state to be not good, and select a first codec using a narrow bandwidth, in operation 905. If the connection state between the electronic device 201 and the external electronic device 202 is determined to be not good, the processor 210 may use the first codec to prevent a sound source reproduced in the external electronic device 202 from being stopped.

If the RSSI value is not smaller than the designated value (No in operation 903), the processor 210 may determine the connection state to be good, and select a second codec using a bandwidth wider than that of the first codec, in operation 907. If the connection state between the electronic device 201 and the external electronic device 202 is determined to be good, the processor 210 may use the second codec to transmit sound source data with high sound quality to the external electronic device 202.

In operation 909, the processor 210 may transmit a data packet (e.g., an audio data packet or a video data packet) through the communication module 220 to the external electronic device 202 by using a codec selected according to the RSSI. The processor 210 may use the RSSI of a response packet as a trigger point changing a codec.

Figure 10:
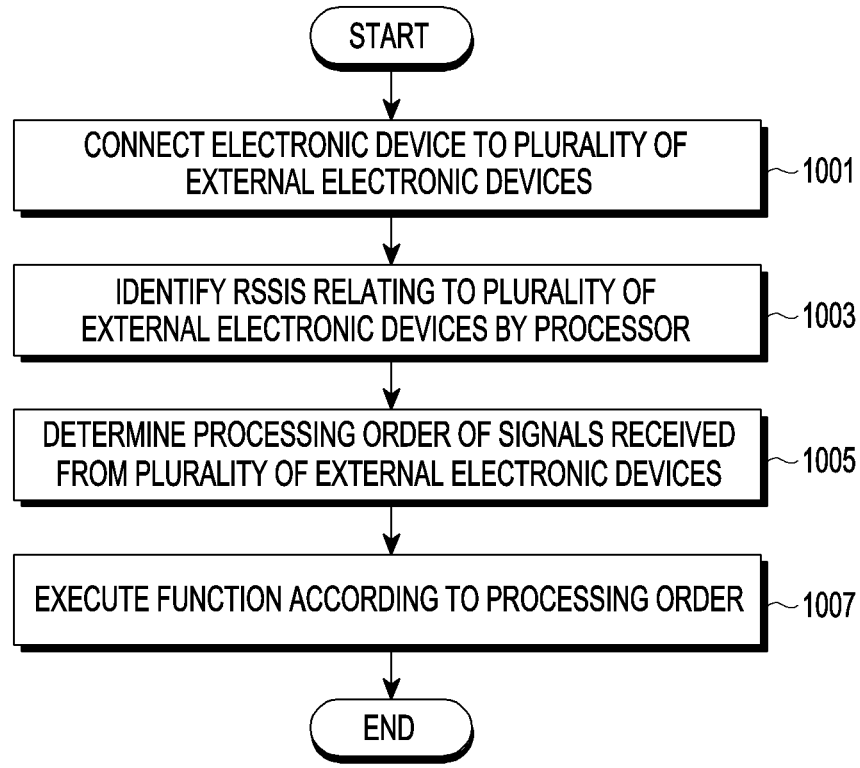
FIG. 10 is a flowchart illustrating an operation of electronic device according to various embodiments.

FIG. 10 is a flowchart illustrating an operation of electronic device according to various embodiments.

Referring to FIG. 10, in operation 1001, an electronic device (e.g., the electronic device 201 in FIG. 2) may be connected to a plurality of external electronic devices (e.g., the external electronic device 202 in FIG. 2). For example, the electronic device 201 may be connected to the plurality of external electronic devices through Bluetooth communication. According to an embodiment, the electronic device 210 may be connected to a Bluetooth low energy (BLE) mesh network together with the plurality of external electronic devices.

In operation 1003, a processor 210 (e.g., the first processor 210 in FIG. 2) of the electronic device 201 may identify an RSSI relating to each of the plurality of external electronic devices. For example, the processor 210 may identify an RSSI of a response packet received from each of the plurality of external electronic devices through a communication module (e.g., the first communication module 220 in FIG. 2). The processor 210 may identify the RSSI through a first packet as described above.

In operation 1005, the processor 210 may determine a processing order of signals (e.g., signals required to be processed by the electronic device 201) received from the plurality of external electronic devices, based on RSSIs relating to the plurality of external electronic devices. For example, the processor 210 may preferentially process a signal of an external electronic device having a high RSSI among the plurality of external electronic devices.

In operation 1007, the processor 210 may execute a function according to the determined processing order. For example, if the electronic device 201 receives a signal requesting media streaming from the plurality of external electronic devices, the processor 210 preferentially process a signal of an electronic device having a high RSSI.

FIGS. 11A to 11D are diagrams illustrating a user interface provided by an electronic device according to various embodiments.

Referring to FIGS. 11A to 11D, a processor (e.g., the first processor 210 in FIG. 2) of an electronic device (e.g., the electronic device 201 in FIG. 2) may identify an RSSI relating to at least another electronic device (e.g., the external electronic device 202 in FIG. 2) connected through wireless communication (e.g., Bluetooth communication). In addition, the processor 210 may determine a connection state between the electronic device 201 and the at least another electronic device 202, based on the identified RSSI, and provide information relating to the determined connection state to a user.

According to various embodiments, the electronic device 201 may display a user interface (e.g., as indicated by reference numeral 1101, 1102, 1103, or 1105) through a display (e.g., the display device 160 in FIG. 1).

According to various embodiments, a user interface (e.g., as indicated by reference numeral 1101, 1102, 1103, or 1105) may include an indicator 1110 indicating the number of electronic devices currently connected through wireless communication (e.g., Bluetooth communication) with the electronic device 201. For example, the indicator 1110 may include information (e.g., "(4)") indicating that the number of other electronic devices currently connected to the electronic device 201 is "four". In addition, the user interface 1101 may include a status window 1120, 1130, 1140, or 1150 displaying connection states of currently connected electronic devices in various types. FIGS. 11A to 11D illustrate examples of various types of the status windows 1120, 1130, 1140, and 1150 for convenience of explanation of the disclosure, but the technical concept of the disclosure is not limited thereto.

According to various embodiments, a user interface (e.g., as indicated by reference numeral 1101, 1102, 1103, or 1105) may separately display electronic devices connected through wireless communication (e.g., Bluetooth communication), according to attributes (e.g., an audio device, a home appliance device, and a computer peripheral device). For example, if the electronic device 201 is connected to a headphone, a laptop, a mouse, and a sensor through wireless communication, a user interface may separately display the headphone as a first group, the laptop and the mouse as a second group, and the sensor as a third group.

According to various embodiments, a user interface (e.g., as indicated by reference numeral 1101, 1102, 1103, or 1105) may display an object (e.g., icon, text, or image) indicating an external electronic device connected to the electronic device 201. For example, if the electronic device 201 is connected to a mouse, a user interface may display an object associated with the mouse.

Figure 11A:
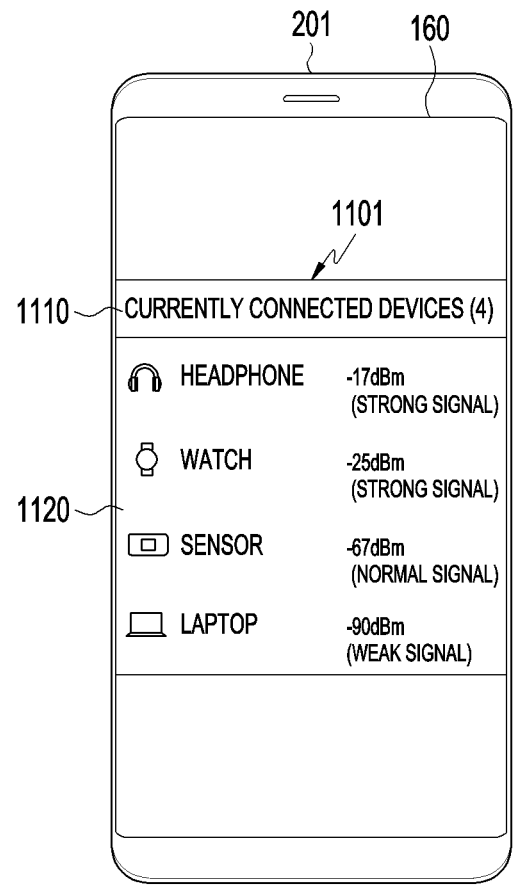
FIGS. 11A to 11D are diagrams illustrating a user interface provided by an electronic device according to various embodiments.

Referring to FIG. 11A, the electronic device 201 may display a first user interface 1101 through a display (e.g., the display device 160 in FIG. 1). The first user interface 1101 may include a first status window 1120 displaying connection states of currently connected external electronic devices.

According to various embodiments, the first status window 1120 may include information relating to the connection states of the currently connected external electronic devices. For example, the first statue window 1120 may display numerical values indicating RSSIs of the external electronic devices together with (or following) the names of the external electronic devices. In addition, the first status window 1120 may display objects (e.g., icon, text, or image) indicating strength degrees (e.g., "strong signal", "normal signal", or "week signal") of reception signals of the external electronic devices together with (or following) the names of the external electronic devices. The first status window 1120 may display information indicating the connection states of the external electronic devices to be blue if the connection state is good, yellow if the connection state is normal, and red if the connection state is bad.

According to an embodiment, the electronic device 201 may display the connection states of the external electronic devices by using various colors. For example, the first status window 1120 may display a numerical value (e.g., −17 dBm) of an RSSI relating to a "headphone" connected to the electronic device 201, and a strength degree (e.g., strong signal) of the reception signal, and display the text color of the "headphone" to be "blue". In addition, the first status window 1120 may display a numerical value (e.g., −90 dBm) of an RSSI relating to a "laptop" connected to the electronic device 201, and a strength degree (e.g., weak signal) of the reception signal, and display the text color of the "laptop" to be "red".

According to an embodiment, the first status window 1120 may arrange the external electronic devices according to the connection states (or the strength of a signal) of currently connected external electronic devices. For example, the first status window 1120 may arrange currently connected external electronic devices according to an order from the best connection state to the worst (or from the largest signal strength to the smallest). On the contrary, the first status window 1120 may also arrange currently connected external electronic devices according to an order from the worst connection state to the best (or from the smallest signal strength to the largest).

Figure 11B:
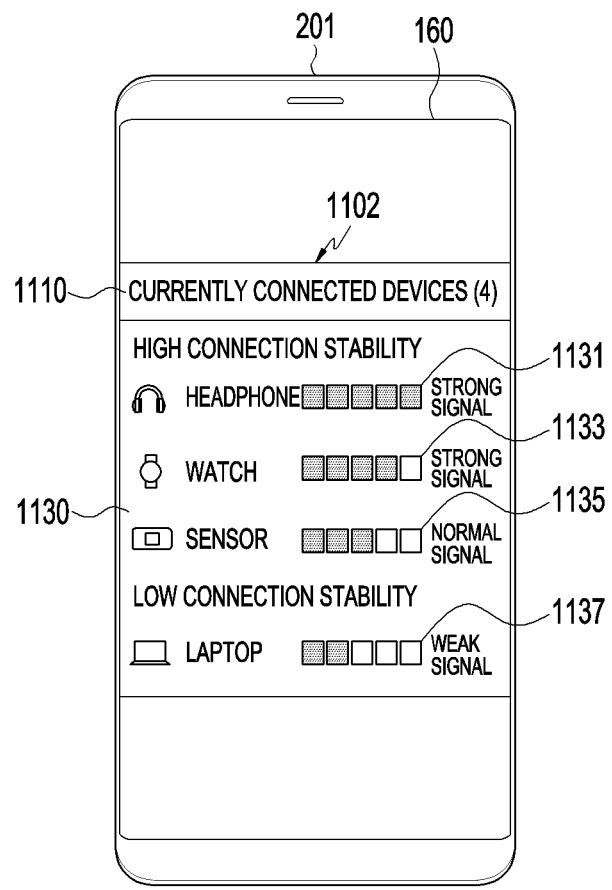

Referring to FIG. 11B, the electronic device 201 may display a second user interface 1102 through a display (e.g., the display device 160 in FIG. 1). The second user interface 1101 may include a second status window 1130 displaying connection states of currently connected external electronic devices.

According to an embodiment, the second status window 1130 may include information relating to the connection states of the currently connected electronic devices. For example, the second statue window 1130 may display a status bar indicating RSSIs of the electronic devices together with (following) the names of the electronic devices. In addition, the second status window 1130 may display strength degrees (e.g., "strong signal", "normal signal", or "week signal") of reception signals of the electronic devices together with (or following) the names of the electronic devices. The second status window 1130 may display information indicating the connection states of the electronic devices to be blue if the connection state is good, yellow if the connection state is normal, and red if the connection state is bad.

According to an embodiment, the second status window 1130 may display status bars 1131, 1133, 1135, and 1137 corresponding to the RSSIs of the external electronic devices connected to the electronic device 201, respectively. For example, the second status window 1130 may display a status bar 1131 corresponding to an RSSI relating to a "headphone" connected to the electronic device 201, and a strength degree (e.g., strong signal) of the reception signal, and display the text color of the "headphone" to be "blue". The second status window 1130 may display a status bar 1137 corresponding to an RSSI relating to a "laptop" connected to the electronic device 201, and a strength degree (e.g., weak signal) of the reception signal, and display the text color of the "laptop" to be "red".

According to various embodiments, the second status window 1130 may further display information relating to connection stability, based on an RSSI of at least one external electronic device connected to the electronic device 201. For example, the second status window 1130 may display (e.g., "high connection stability") an electronic device, the signal strength of which is indicated by "strong signal" and "normal signal", to have high connection stability, and may display (e.g., "low connection stability") an electronic device, the signal strength of which is indicated by "weak signal", to have low connection stability.

Figure 11C:
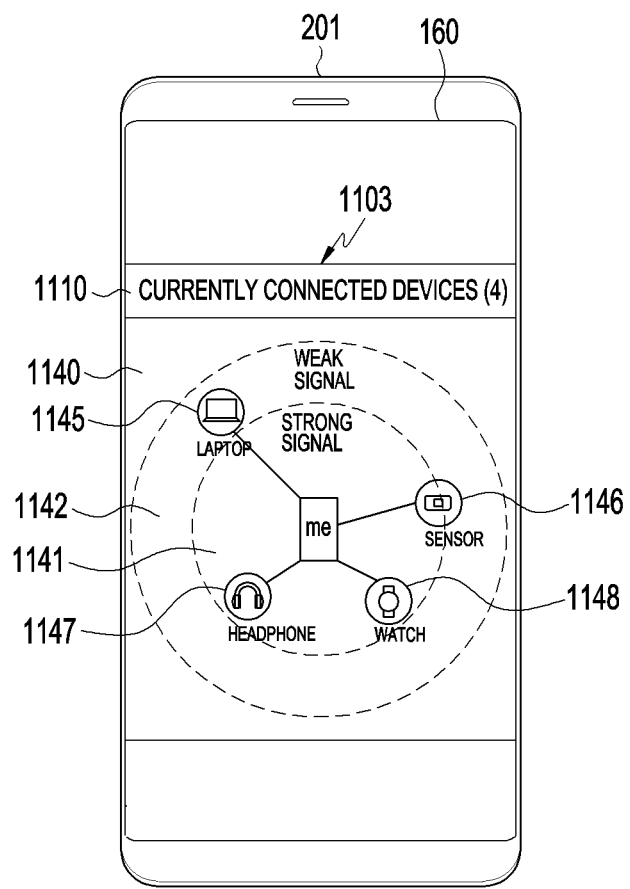

Referring to FIG. 11C, the electronic device 201 may display a third user interface 1103 through a display (e.g., the display device 160 in FIG. 1). The third user interface 1103 may include a third status window 1140 displaying connection states of currently connected external electronic devices.

According to an embodiment, the third status window 1140 may include information relating to the connection states of the currently connected external electronic devices. For example, the third status window 1140 may display objects 1145, 1146, 1147, and 1148 indicating the electronic devices in virtual regions 1141 and 1142 corresponding to RSSIs, according to the RSSI (or connection state) of a data packet received from each of the external electronic devices by the electronic device 201. The third status window 1140 may display the object 1145, 1146, 1147, or 1148 indicating the corresponding external electronic device in the virtual regions 1141 and 1142 such that the stronger the RSSI, the closer to the center of the virtual regions.

The third status window 1140 may display an electronic device corresponding to "strong signal" in the first region 1141, and may display an electronic device corresponding to "weak signal" in the second region 1142. In addition, the third status window 1140 may display an external electronic device corresponding to "normal signal" on a boundary between the first region 1141 and the second region 1142. For example, the third status window 1140 may display the object 1147 of a "headphone" connected to the electronic device 201 in the first region 1141. The third status window 1140 may display the object 1145 of a "laptop" connected to the electronic device 201 in the second region 1142. In addition, the third status window 1140 may display the object 1146 of a "sensor" connected to the electronic device 210 on the boundary between the first region 1141 and the second region 1142.

Figure 11D:
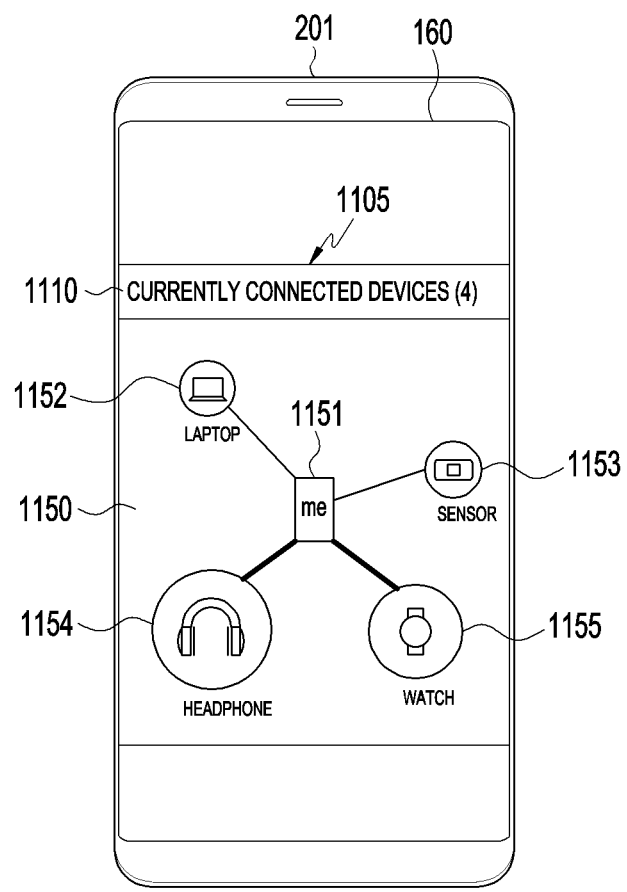

Referring to FIG. 11D, the electronic device 201 may display a fourth user interface 1105 through a display (e.g., the display device 160 in FIG. 1). The fourth user interface 1105 may include a fourth status window 1150 displaying connection states of currently connected external electronic devices.

According to an embodiment, the fourth status window 1150 may include information relating to the connection states of the currently connected electronic devices. For example, the fourth status window 1150 may display an object 1151 indicating the electronic device 201, and objects 1152, 1153, 1154, and 1155 indicating the external electronic devices connected to the electronic device 201, according to the RSSIs of the external electronic devices. In addition, the fourth status window 1150 may display the objects 1152, 1153, 1154, and 1155 to have sizes corresponding to the RSSIs, respectively. The fourth status window 1150 may display the objects such that the stronger the RSSI, the greater the size of the object. In addition, the fourth status window 1150 may distinguishably display lines between the object 1151 of the electronic device 201 and the external electronic devices, based on the RSSIs.

The fourth status window 1150 may display the object of an electronic device corresponding to "strong signal" to be large, and may display the object of an electronic device corresponding to "weak signal" to be small. For example, the fourth status window 1150 may display the object 1154 of a "headphone" connected to the electronic device 201 to be larger than the other objects 1152, 1153, and 1155. The fourth status window 1150 may display the object 1122 of a "laptop" connected to the electronic device 201 to be smaller than the other objects 1153, 1154, and 1155. In addition, the line between the object 1154 of the "headphone" and the object 1151 of the electronic device 201 may be displayed to be thick or displayed by using a different color, so that the line can be distinguished from the line between the object 1152 of the "laptop" and the object 1151 of the electronic device 201.

FIGS. 12A to 12D are diagrams illustrating an RSSI controlled through a user interface provided by an electronic device according to various embodiments.

Referring to FIGS. 12A to 12D, a processor (e.g., the first processor 210 in FIG. 2) of an electronic device (e.g., the electronic device 201 in FIG. 2) may identify an RSSI relating to at least another electronic device (e.g., the external electronic device 202 in FIG. 2) connected through wireless communication (e.g., Bluetooth communication), and provide information relating to a connection state between the electronic device 201 and the at least another electronic device 202, based on the identified RSSI.

The electronic device 201 may display a user interface indicating the connection state on a display (e.g., the display device 160 in FIG. 1). In addition, the electronic device 201 may adjust transfer power of a communication module (e.g., the first communication module 220 in FIG. 2) in response to an input relating to the user interface.

Figure 12A:
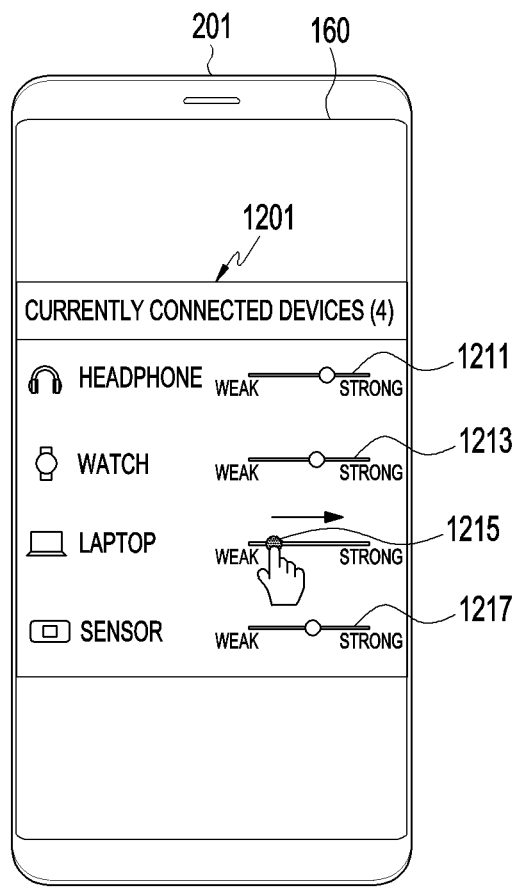
FIGS. 12A to 12D are diagrams illustrating an RSSI controlled through a user interface provided by an electronic device according to various embodiments.

Referring to FIG. 12A, the electronic device 201 may display, on the display 160, a first user interface 1201 indicating a connection state of at least one external electronic device connected to the electronic device 201 through wireless communication.

The first user interface 1201 may display an adjustment bar (e.g., as indicated by reference numerals 1211, 1213, 1215, and 1217) through which the connection state of the at least one external electronic device can be adjusted. For example, the first user interface 1201 may display an adjustment bar 1215 relating to a "laptop" connected to the electronic device 201. According to a user drag input relating to the adjustment bar 1215, the processor 210 may adjust transfer power of a data packet transmitted to the "laptop" through the communication module 220. For example, if the adjustment bar 1215 is dragged to the right side, the processor 210 may increase the transfer power of a data packet transmitted to the "laptop" through the communication module 220. If the adjustment bar 1215 is dragged to the left side, the processor 210 may decrease the transfer power of a data packet transmitted to the "laptop". According to the user drag input, the first user interface 1201 may display the adjustment bar 1215 by using a particular color, or display the adjustment bar 1215 to be dark. In addition, according to the user drag input, the electronic device 201 may output vibration or further display a pop-up message.

Figure 12B:
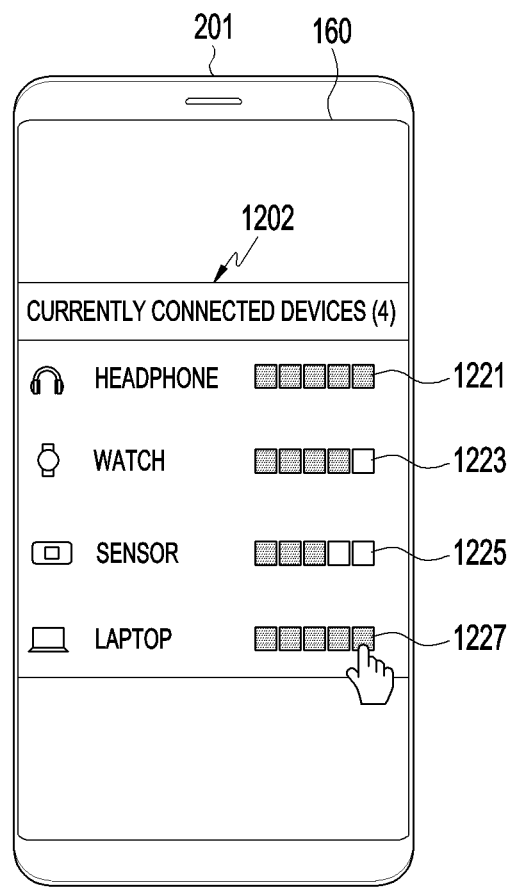

Referring to FIG. 12B, the electronic device 201 may display, on the display 160, a second user interface 1202 indicating a connection state of at least one external electronic device connected to the electronic device 201 through wireless communication.

According to various embodiments, the second user interface 1202 may display a status bar (e.g., as indicated by reference numerals 1221, 1223, 1225, and 1227) through which the connection state of the at least one external electronic device can be adjusted. For example, the second user interface 1202 may display a status bar 1227 relating to a "laptop" connected to the electronic device 201. According to a user touch input relating to the status bar 1227, the processor 210 may adjust transfer power of a data packet transmitted to the "laptop" through the communication module 220. For example, the processor 210 may increase the transfer power of a data packet transmitted to the "laptop" through the communication module 220, to be a strength corresponding to a position at which the touch input is received. In addition, the processor 210 may decrease the transfer power of a data packet transmitted to the "laptop" through the communication module 220, to be a strength corresponding to a position at which the touch input is received. According to the user touch input, the second user interface 1202 may display the status bar 1227 by using a particular color, or display the status bar 1227 to be dark. In addition, according to the user touch input, the electronic device 201 may output vibration or further display a pop-up message.

According to various embodiments, according to a user touch input relating to the status bar 1227, the processor 210 may adjust transfer speed of a data packet transmitted to the "laptop" through the communication module 220. For example, the processor 210 may increase (decrease) the transfer speed of a data packet transmitted to the "laptop" through the communication module 220, to be a speed corresponding to a position at which the touch input is received.

According to various embodiments, according to a user touch input relating to the status bar 1227, the processor 210 may adjust a codec relating to a data packet (e.g., a sound source data packet) transmitted to the "laptop" through the communication module 220. For example, the processor 210 may configure a codec relating to a data packet transmitted to the "laptop" through the communication module 220, to be a codec corresponding to a position at which the touch input is received.

Figure 12C:
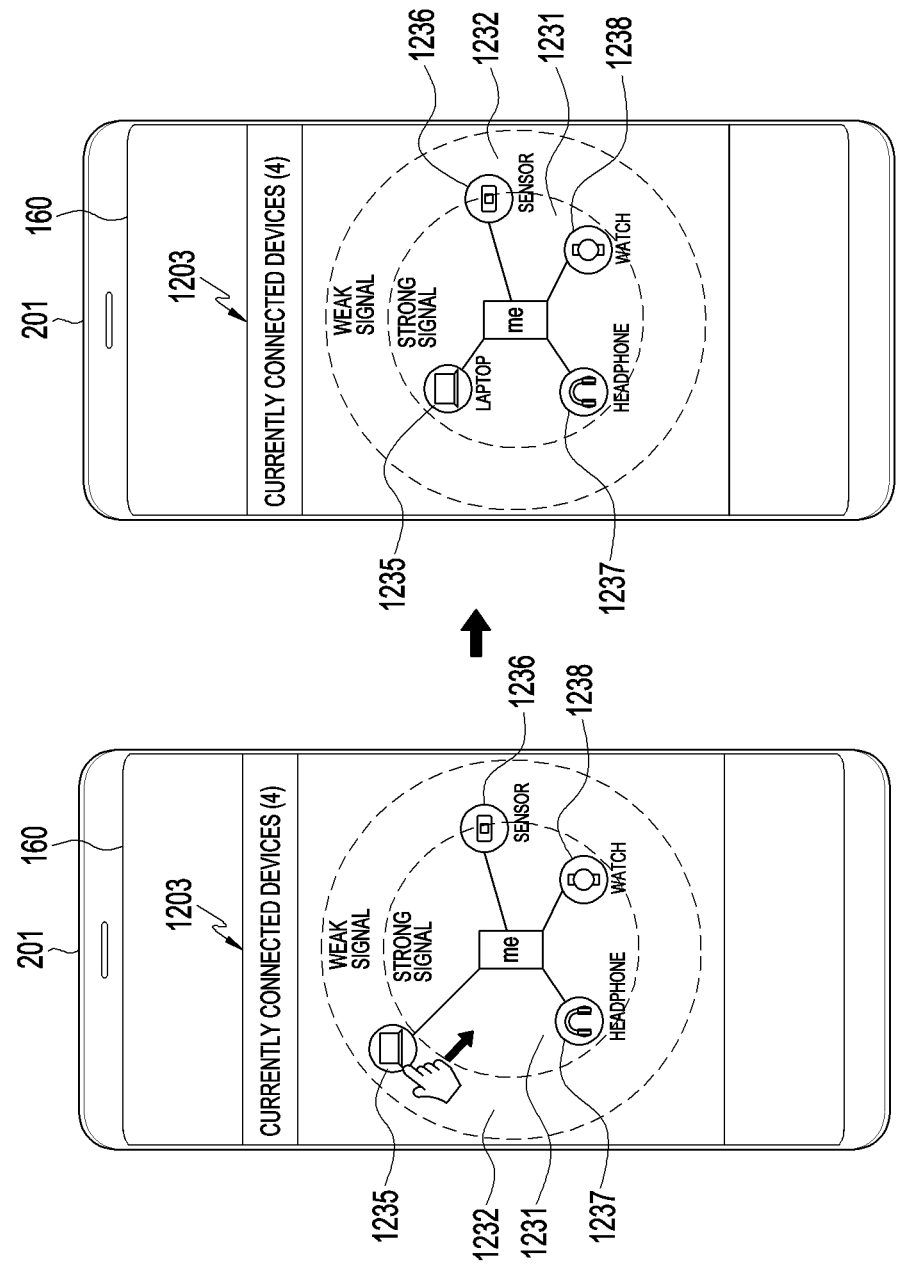

Referring to FIG. 12C, the electronic device 201 may display, on the display 160, a third user interface 1203 indicating a connection state of at least one external electronic device connected to the electronic device 201 through wireless communication.

The third user interface 1203 may display objects 1235, 1236, 1237, and 1238 indicating the at least one external electronic device in a first region 1231 and a second region 1232 according to the connection state of the at least one external electronic device. For example, the third user interface 1203 may display the object of an external electronic device, the RSSI of which is high, in the first region 1231, and may display the object of an external electronic device, the RSSI of which is low, in the second region 1232. According to a touch-and-drag input relating to the object indicating at least one external electronic device, the processor 210 may adjust transfer power of a data packet transmitted to the external electronic device through the communication module 220.

According to various embodiments, if a user selects the object 1235 of a "laptop" in a scheme, long clicking or simple touching for example, and drags the object 1235 of the "laptop" inside the first region 1231, the third user interface 1203 may move the object 1235 of the "laptop" into the first region 1231. In addition, the processor 210 may control the transfer power of a data packet transmitted to the "laptop" through the communication module 220, to be increased. On the contrary, if the object 1237 of a "headphone" is dragged outside the first region 1231 (or to the second region 1232), the processor 210 may decrease transfer power relating to the "headphone".

According to various embodiments, according to a user touch-and-drag input relating to the status bar 1225, the processor 210 may adjust transfer speed of a data packet transmitted to the "laptop" through the communication module 220. For example, the processor 210 may increase (decrease) the transfer speed of a data packet transmitted to the "laptop" through the communication module 220, to be a speed corresponding to a position at which the touch-and-drag input is received.

According to various embodiments, according to a user touch-and-drag input relating to the status bar 1225, the processor 210 may adjust a codec relating to a data packet (e.g., a sound source data packet) transmitted to the "laptop" through the communication module 220. For example, the processor 210 may configure a codec relating to a data packet transmitted to the "laptop" through the communication module 220, to be a codec corresponding to a position at which the touch-and-drag input is received.

Figure 12D:
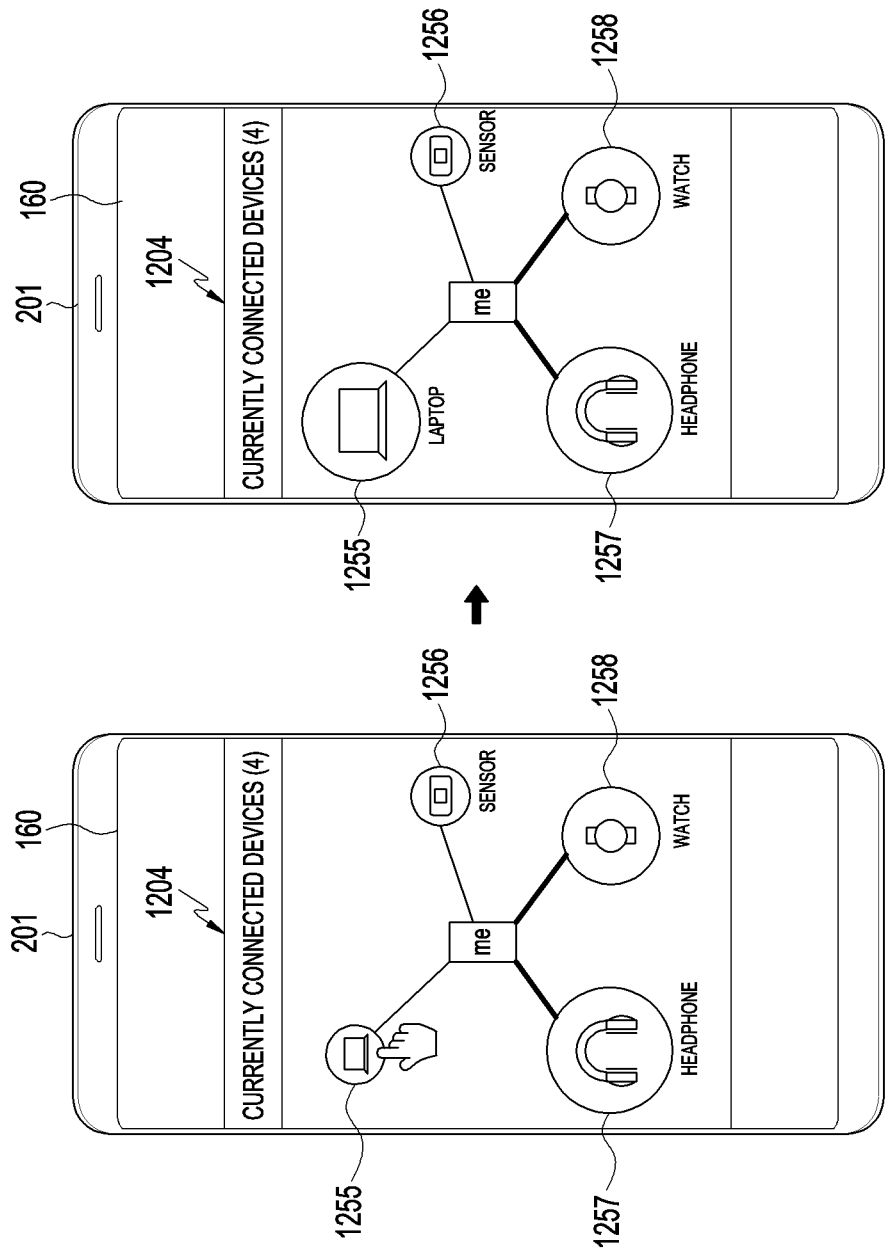

Referring to FIG. 12D, the electronic device 201 may display, on a display, a fourth user interface 1204 indicating a connection state of at least one external electronic device connected to the electronic device 201 through wireless communication.

The fourth user interface 1204 may display an object 1255, 1256, 1257, or 1258 indicating the at least one external electronic device, the object having the same size or a different size, according to the connection state of the at least one external electronic device. For example, the fourth user interface 1204 may display the object 1255, 1256, 1257, or 1258 of an external electronic device, the RSSI of which is high, to be relatively large, and may display the object 1255, 1256, 1257, or 1258 of an external electronic device, the RSSI of which is low, to be relatively small. According to a touch input (e.g., a long click, a double click, or a tap input) relating to the object 1255, 1256, 1257, or 1258 indicating at least one external electronic device, the processor 210 may adjust transfer power of a data packet transmitted to the external electronic device through the communication module 220.

For example, if a user selects the object 1255 of the "laptop" in a scheme, long clicking or double clicking for example, the fourth user interface 1204 may display the object 1255 of the "laptop" to be large. The processor 210 may control the transfer power of a data packet transmitted to the "laptop" through the communication module 220, to be increased. In addition, if a user selects the object 1255 of the "laptop" in a scheme, long clicking or double clicking for example, the fourth user interface 1204 may display the object 1255 of the "laptop" to temporarily flicker, or display the object by using a different color.

Figure 13A:
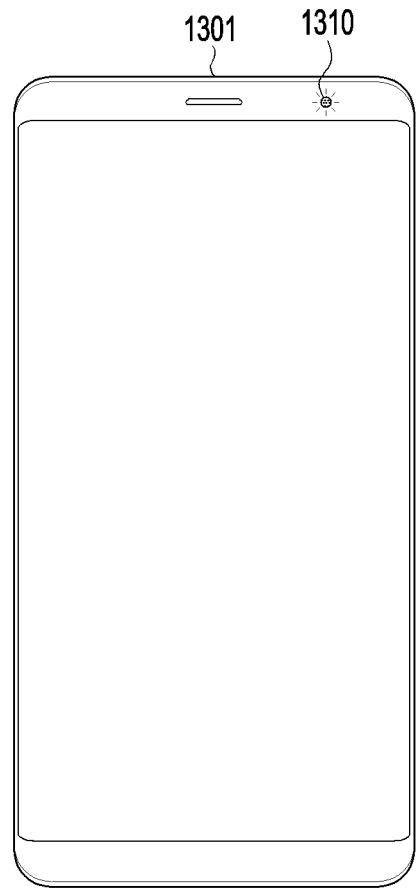
FIGS. 13A to 13C are diagrams illustrating a method for providing information relating to a connection state by an electronic device according to various embodiments.
Figure 13B:
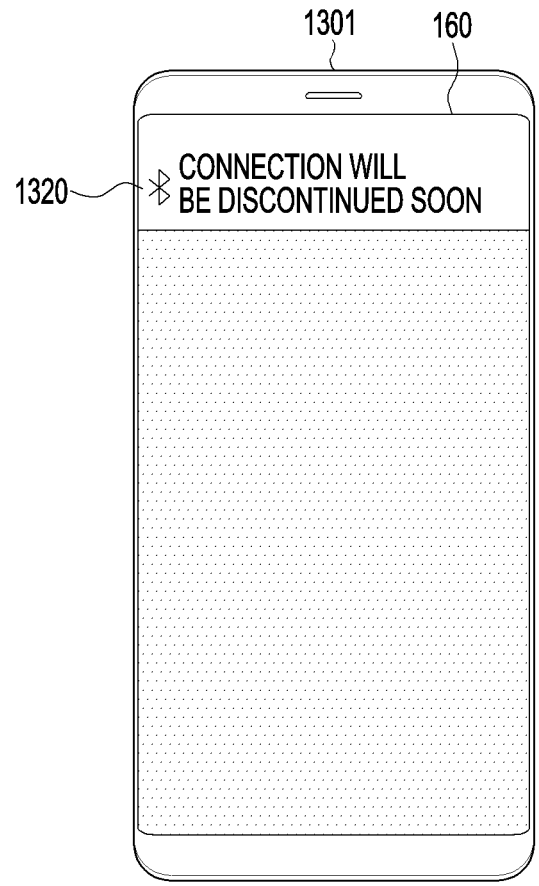
Figure 13C:
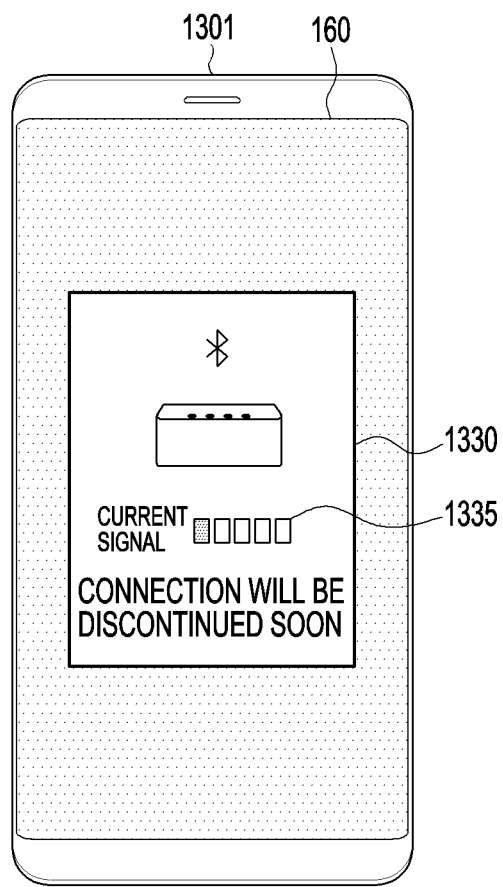

FIGS. 13A to 13C are diagrams illustrating a method for providing information relating to a connection state by an electronic device according to various embodiments.

Referring to FIGS. 13A to 13C, an electronic device 1301 (e.g., the electronic device 201 in FIG. 2) may determine a connection state between the electronic device 1301 and an external electronic device (e.g., the external electronic device 202 in FIG. 2), based on an RSSI, and provide information relating to the determined connection state to a user. For example, if the RSSI is momentarily greatly decreased, the RSSI becomes smaller than a designated value (e.g., −91 dBm), or disconnection is predicted, the electronic device 1301 may provide a notification relating to the connection state.

Referring to FIG. 13A, the electronic device 1301 may provide a notification relating to the connection state with the external electronic device 202 through an optical element 1310.

The electronic device 1301 may provide light changing, light outputting, and light flickering through the optical element 1310. In addition, the electronic device 1301 may output particular vibration or sound through an output device (e.g., the output device 155 in FIG. 1).

Referring to FIG. 13B, the electronic device 1301 may display a push message 1320 through a display (e.g., the display device 160 in FIG. 1).

According to various embodiments, through the push message 1320, the electronic device 1301 may notify of the current connection state, and/or the fact that disconnection is predicted. In addition, the electronic device 1301 may output particular vibration or sound through an output device (e.g., the output device 155 in FIG. 1) together with the push message 1320.

According to various embodiments, the electronic device 1301 may display the push message 1320 through an always-on-display (AOD).

Referring to FIG. 13C, the electronic device 1301 may display a pop-up message 1330 through a display (e.g., the display device 160 in FIG. 1).

Through the pop-up message 1330, the electronic device 1301 may notify of the current connection state, and/or the fact that disconnection is predicted. The electronic device 1301 may also provide a status bar 1335 indicating a connection state with respect to an external electronic device (e.g., the external electronic device 202 in FIG. 2) in the pop-up message 1330. In addition, the electronic device 1301 may output particular vibration or sound through an output device (e.g., the output device in FIG. 1) together with the pop-up message 1330.

Figure 14:
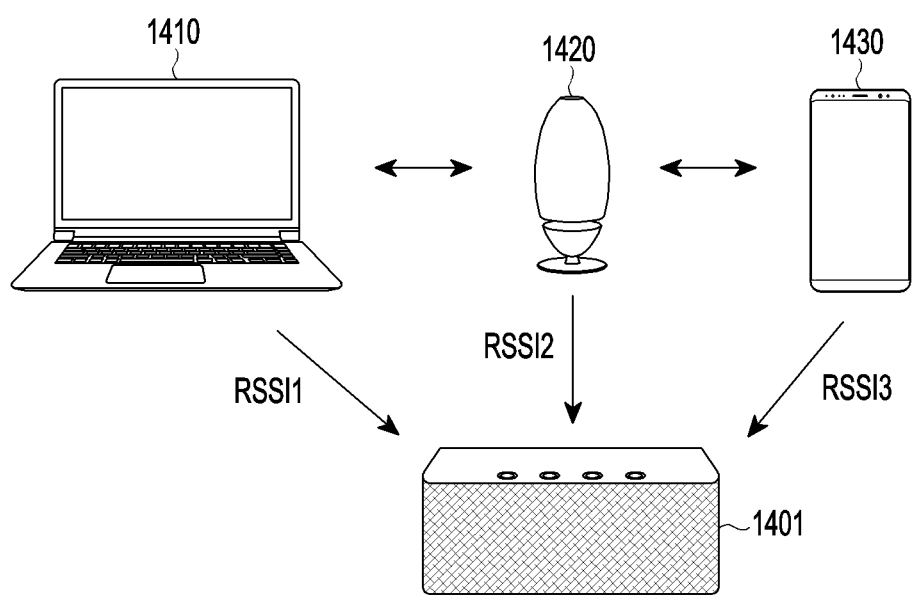
FIG. 14 is a diagram illustrating a state in which an electronic device according to various embodiments is connected to a plurality of external electronic devices.

FIG. 14 is a data flow by which an electronic device according to various embodiments communicates with an external electronic device.

Referring to FIG. 14, an electronic device (e.g., the electronic device 201 in FIG. 2) 1401 may be connected to a plurality of external electronic devices 1410, 1420, and 1430. For example, the electronic device 1401 may be connected to the plurality of external electronic devices 1410, 1420, and 1430 through Bluetooth communication. In addition, the electronic device 1401 may configure a Bluetooth low energy (BLE) mesh network with the plurality of external electronic devices 1410, 1420, and 1430.

A processor (e.g., the first processor 210 in FIG. 2) of the electronic device 1401 may identify RSSIs (RSSI1, RSSI2, and RSSI3) relating to the plurality of external electronic devices 1410, 1420, and 1430. For example, the processor 210 may identify the RSSIs of the plurality of external electronic devices 1410, 1420, and 1430 through a first packet, as in a method illustrated in FIGS. 2 to 13.

The processor 210 may determine a processing order of signals (e.g., signals required to be processed by the electronic device 1401) simultaneously received from the plurality of external electronic devices 1410, 1420, and 1430, based on the RSSIs (RSSI1, RSSI2, and RSSI3) relating to the plurality of external electronic devices 1410, 1420, and 1430.

The processor 210 may preferentially process a signal received from an external electronic device having the best connection state among the plurality of external electronic devices 1410, 1420, and 1430. For example, the processor 210 may preferentially process a signal of an external electronic device corresponding to the highest RSSI among the identified RSSIs (RSSI1, RSSI2, and RSSI3). For example, if the RSSI (RSSI1) of the first external electronic device 1410 is −16 dBm, the RSSI (RSSI2) of the second external electronic device 1420 is −90 dBm, and the RSSI (RSSI3) of the third external electronic device 1430 is −35 dBm, the processor 210 may firstly process a signal received from the first external electronic device 1410. In addition, the processor 210 may lastly process a signal received from the second external electronic device 1420.

An operating method of an electronic device 201 including a communication module 220 and a processor 210 according to various embodiments of the disclosure may include: transmitting, by the communication module 220, a data packet to an external electronic device 202 connected to the electronic device 201; receiving a response packet corresponding to the data packet from the external electronic device 202 by the communication module 220; acquiring a received signal strength indication (RSSI) of the response packet by the communication module 220; if the response packet is received, transmitting a first packet including information on the RSSI to the processor 210 by the communication module 220; and identifying the RSSI of the response packet by the processor 210 by using the first packet.

The first packet may be a packet indicating the number of data packets completed to be transmitted from the electronic device 201 to the external electronic device 202.

The communication module 220 may further include adding the information relating to the RSSI to at least a part of bits in a parameter relating to a connection handle included in the first packet.

The at least a part of bits may include a bit reserved in a field of the parameter relating to the connection handle, which is proposed in a Bluetooth standard.

The operating method of the electronic device 201 may further include adding, by the communication module 220, the information relating to the RSSI to at least a part of bits in a parameter which is included in the first packet and relates to the number of data packets completed to be transmitted from the electronic device 201 to the external electronic device 202.

The operating method of the electronic device 201 may further include providing, by the processor 210, information relating to a connection state between the electronic device 201 and the external electronic device 202, based on the RSSI.

The communication module 220 may be implemented as a controller proposed in a Bluetooth standard, and the processor may be implemented as a host proposed in the Bluetooth standard.

A non-transitory computer-readable recording medium according to various embodiments may store a program for executing operations of: transmitting, by a communication module 220 of an electronic device 201, a data packet to an external electronic device 202 connected to the electronic device 201; receiving a response packet corresponding to the data packet from the external electronic device by the communication module 220; acquiring a received signal strength indication (RSSI) of the response packet by the communication module 220; if the response packet is received, transmitting a first packet including information on the RSSI to a processor 210 of the electronic device by the communication module 220; and identifying the RSSI of the response packet by the processor 210 of the electronic device 201 by using the first packet.

Each of the aforementioned elements of the electronic device may include one or more components, and the name of the components may vary depending on the type of the electronic device. In various embodiments, the electronic device may be configured to include at least one of the above-described elements, and may exclude a part of the elements or may include other additional elements. In addition, according to various embodiments, some of the elements of the electronic device may be combined into a single entity that performs the same functions as those of the corresponding elements prior to the combination.

The embodiments disclosed herein are proposed for explanation and understanding of the disclosed technical contents, and are not intended to limit the scope of the disclosure. Therefore, the scope of the disclosure should be interpreted as including all the variations or various other embodiments based on the technical concept of the disclosure.

The invention claimed is:

1. An electronic device comprising:
a communication module; and
a processor,
wherein the communication module is configured to:
transmit a data packet received from the processor to an external electronic device connected to the electronic device,
receive a response packet corresponding to the data packet from the external electronic device,
acquire a received signal strength indication (RSSI) of the response packet, and
if the response packet is received, transmit a first packet including information on the RSSI to the processor, and
wherein the processor is configured to identify the RSSI of the response packet by using the first packet received from the communication module.

2. The electronic device of claim 1, wherein the first packet is a packet indicating a number of data packets completed to be transmitted from the electronic device to the external electronic device.

3. The electronic device of claim 2, wherein the communication module is configured to add the information relating to the RSSI to at least a part of bits in a parameter relating to a connection handle included in the first packet.

4. The electronic device of claim 3, wherein the at least a part of bits comprises a bit reserved in a field of the parameter relating to the connection handle, which is proposed in a Bluetooth standard.

5. The electronic device of claim 2, wherein the communication module is configured to add the information relating to the RSSI to at least a part of bits in a parameter which is included in the first packet and relates to a number of data packets completed to be transmitted from the electronic device to the external electronic device.

6. The electronic device of claim 5, wherein the at least a part of bits comprises a bit that is not reserved in a field of the parameter relating to the number of the data packets completed to be transmitted, which is proposed in the Bluetooth standard.

7. The electronic device of claim 1, wherein the first packet is a packet obtained by adding the information relating to the RSSI to a packet indicating a number of data packets completed to be transmitted from the electronic device to the external electronic device.

8. The electronic device of claim 1, wherein the processor is configured to provide information relating to a connection state between the electronic device and the external electronic device, based on the RSSI.

9. The electronic device of claim 1, wherein the processor is configured to adjust transfer power of the data packet transmitted through the communication module to the external electronic device, based on the RSSI.

10. The electronic device of claim 1, wherein the processor is configured to change a transfer speed of a data packet transmitted through the communication module to the external electronic device, based on the RSSI.

11. The electronic device of claim 1, wherein the processor is configured to select a codec using a bandwidth corresponding to the RSSI, based on the RSSI.

12. The electronic device of claim 1, wherein the processor is configured to, if the electronic device is connected to a plurality of external electronic devices, identify RSSIs relating to the plurality of external electronic devices and determine a processing order of signals received from the plurality of external electronic devices, based on the RSSIs.

13. An operating method of an electronic device comprising a communication module and a processor, the method comprising:
   transmitting, by the communication module, a data packet to an external electronic device connected to the electronic device;
   receiving a response packet corresponding to the data packet from the external electronic device by the communication module;
   acquiring a received signal strength indication (RSSI) of the response packet by the communication module;
   if the response packet is received, transmitting a first packet including information on the RSSI to the processor by the communication module; and
   identifying the RSSI of the response packet by the processor by using the first packet.

14. The operating method of claim 13, wherein the first packet is a packet indicating a number of data packets completed to be transmitted from the electronic device to the external electronic device.

15. The operating method of claim 14, further comprising:
   adding, by the communication module, the information relating to the RSSI to at least a part of bits in a parameter relating to a connection handle included in the first packet.

* * * * *